(12) United States Patent
Högasten et al.

(10) Patent No.: US 9,235,876 B2
(45) Date of Patent: Jan. 12, 2016

(54) ROW AND COLUMN NOISE REDUCTION IN THERMAL IMAGES

(71) Applicant: FLIR Systems, Inc., Wilsonville, OR (US)

(72) Inventors: Nicholas Högasten, Santa Barbara, CA (US); Malin Ingerhed, Linköping (SE); Mark Nussmeier, Goleta, CA (US); Eric A. Kurth, Santa Barbara, CA (US); Theodore R. Hoelter, Goleta, CA (US); Katrin Strandemar, Rimbo (SE); Pierre Boulanger, Goleta, CA (US); Barbara Sharp, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 113 days.

(21) Appl. No.: 14/029,716

(22) Filed: Sep. 17, 2013

(65) Prior Publication Data

US 2014/0037225 A1    Feb. 6, 2014

Related U.S. Application Data

(63) Continuation-in-part of application No. 13/622,178, filed on Sep. 18, 2012, which is a continuation-in-part of application No. 13/529,772, filed on Jun. 21, 2012, now Pat. No. 8,780,208, which is a continuation of (Continued)

(51) Int. Cl.
*G06K 9/40* (2006.01)
*G06T 5/00* (2006.01)

(Continued)

(52) U.S. Cl.
CPC . *G06T 5/002* (2013.01); *G06T 5/50* (2013.01); *H04N 5/2253* (2013.01);

(Continued)

(58) Field of Classification Search
CPC . G06T 5/002; G06T 5/50; G06T 2207/10016; G06T 2207/20182; G06T 2207/10048; H04N 5/33; H04N 5/3658; H04N 5/2253; H04N 5/2254; H04N 5/2257

USPC .......................................... 382/260, 274–275
See application file for complete search history.

(56) References Cited

U.S. PATENT DOCUMENTS 2,764,055 A    9/1956  Clemens at al.
5,258,621 A    11/1993 Noble (Continued)

FOREIGN PATENT DOCUMENTS

CA    2764055    7/2012
CN    1917590    2/2007

(Continued)

OTHER PUBLICATIONS

FLIR, "FLIR P640 Infrared Camera", Jan. 23, 2010, pp. 1-2 http://www.flir.com/uploadedFiles/Thermociraphy_APAC/Products/Product_Literature/AU_P640_Datasheet_APAD.pdf.

(Continued)

*Primary Examiner* — Kanjibhai Patel
(74) *Attorney, Agent, or Firm* — Haynes and Boone, LLP

(57) ABSTRACT

Methods and systems are provided to reduce noise in thermal images. In one example, a method includes receiving an image frame comprising a plurality of pixels arranged in a plurality of rows and columns. The pixels comprise thermal image data associated with a scene and noise introduced by an infrared imaging device. The image frame may be processed to determine a plurality of column correction terms, each associated with a corresponding one of the columns and determined based on relative relationships between the pixels of the corresponding column and the pixels of a neighborhood of columns. In another example, the image frame may be processed to determine a plurality of non-uniformity correction terms, each associated with a corresponding one of the pixels and determined based on relative relationships between the corresponding one of the pixels and associated neighborhood pixels within a selected distance.

23 Claims, 28 Drawing Sheets

Related U.S. Application Data application No. 12/396,340, filed on Mar. 2, 2009, now Pat. No. 8,208,026, application No. 14/029,716, which is a continuation-in-part of application No. PCT/US2012/041744, filed on Jun. 8, 2012, and a continuation-in-part of application No. PCT/US2012/041749, filed on Jun. 8, 2012, and a continuation-in-part of application No. PCT/US2012/041739, filed on Jun. 8, 2012.

(60) Provisional application No. 61/745,489, filed on Dec. 21, 2012, provisional application No. 61/745,504, filed on Dec. 21, 2012, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011.

(51) Int. Cl.
  *G06T 5/50* (2006.01)
  *H04N 5/33* (2006.01)
  *H04N 5/365* (2011.01)
  *H04N 5/225* (2006.01)

(52) U.S. Cl.
  CPC .......... *H04N 5/2254* (2013.01); *H04N 5/2257* (2013.01); *H04N 5/33* (2013.01); *H04N 5/3658* (2013.01); *G06T 2207/10016* (2013.01); *G06T 2207/10048* (2013.01); *G06T 2207/20182* (2013.01)

(56) References Cited

U.S. PATENT DOCUMENTS

| | | | |
|---|---|---|---|
| 5,654,549 A | 8/1997 | Landecker et al. |
| 5,721,427 A | 2/1998 | White et al. |
| 5,881,182 A | 3/1999 | Fiete et al. |
| 5,903,659 A | 5/1999 | Kilgore |
| 6,348,951 B1 | 2/2002 | Kim |
| 6,396,543 B1 | 5/2002 | Shin et al. |
| 6,424,843 B1 | 7/2002 | Reitmaa et al. |
| 6,633,231 B1 | 10/2003 | Okamoto et al. |
| 6,681,120 B1 | 1/2004 | Kim |
| 6,759,949 B2 | 7/2004 | Miyahara |
| 6,883,054 B2 | 4/2005 | Yamaguchi et al. |
| 6,911,652 B2 | 6/2005 | Walkenstein |
| 7,050,107 B1 | 5/2006 | Frank et al. |
| D524,785 S | 7/2006 | Huang |
| 7,084,857 B2 | 8/2006 | Lieberman et al. |
| 7,208,733 B2 | 4/2007 | Mian et al. |
| 7,263,379 B1 | 8/2007 | Parkulo et al. |
| 7,284,921 B2 | 10/2007 | Lapstun et al. |
| 7,296,747 B2 | 11/2007 | Rohs |
| 7,305,368 B2 | 12/2007 | Lieberman et al. |
| 7,321,783 B2 | 1/2008 | Kim |
| 7,333,832 B2 | 2/2008 | Tsai et al. |
| 7,377,835 B2 | 5/2008 | Parkulo et al. |
| 7,420,663 B2 | 9/2008 | Wang et al. |
| 7,453,064 B2 | 11/2008 | Lee |
| 7,477,309 B2 | 1/2009 | Cuccias |
| 7,566,942 B2 | 7/2009 | Viens et al. |
| 7,567,818 B2 | 7/2009 | Pylkko |
| 7,572,077 B2 | 8/2009 | Lapstun et al. |
| 7,575,077 B2 | 8/2009 | Priepke et al. |
| 7,595,904 B2 | 9/2009 | Lapstun et al. |
| 7,627,364 B2 | 12/2009 | Sato |
| 7,697,962 B2 | 4/2010 | Cradick et al. |
| 7,723,686 B2 | 5/2010 | Hannebauer |
| 7,725,141 B2 | 5/2010 | Su |
| 7,728,281 B2 | 6/2010 | Chen |
| 7,735,974 B2 | 6/2010 | Silverbrook et al. |
| 7,747,454 B2 | 6/2010 | Bartfeld et al. |
| 7,760,919 B2 | 7/2010 | Namgoong |
| 7,761,114 B2 | 7/2010 | Silverbrook et al. |
| 7,773,870 B2 | 8/2010 | Naruse |
| 7,801,733 B2 | 9/2010 | Lee et al. |
| 7,805,020 B2 | 9/2010 | Trudeau et al. |
| 7,810,733 B2 | 10/2010 | Silverbrook et al. |
| 7,872,574 B2 | 1/2011 | Betts et al. |
| 7,900,842 B2 | 3/2011 | Silverbrook et al. |
| 7,903,152 B2 | 3/2011 | Kim |
| 7,947,222 B2 | 5/2011 | Bae et al. |
| 7,960,700 B2 | 6/2011 | Craig et al. |
| 8,189,050 B1 | 5/2012 | Hughes et al. |
| 8,203,116 B2 | 6/2012 | Young |
| 8,208,026 B2 | 6/2012 | Högasten et al. |
| 8,275,413 B1 | 9/2012 | Fraden et al. |
| 8,305,577 B2 | 11/2012 | Kivioja et al. |
| 8,345,226 B2 | 1/2013 | Zhang |
| 8,537,343 B2 | 9/2013 | Zhang |
| 8,781,420 B2 | 7/2014 | Schlub et al. |
| 8,825,112 B1 | 9/2014 | Fraden et al. |
| 2002/0006337 A1 | 1/2002 | Kimura et al. |
| 2002/0122036 A1 | 9/2002 | Sasaki |
| 2002/0135571 A1 | 9/2002 | Klocek et al. |
| 2002/0140542 A1 | 10/2002 | Prokoski et al. |
| 2002/0149600 A1 | 10/2002 | Van Splunter et al. |
| 2003/0007193 A1 | 1/2003 | Sato et al. |
| 2003/0093805 A1 | 5/2003 | Gin |
| 2003/0112871 A1 | 6/2003 | Demos |
| 2003/0122957 A1 | 7/2003 | Emme |
| 2003/0146975 A1 | 8/2003 | Joung et al. |
| 2003/0198400 A1 | 10/2003 | Alderson et al. |
| 2003/0223623 A1 | 12/2003 | Gutta et al. |
| 2004/0047518 A1 | 3/2004 | Tiana |
| 2004/0101298 A1 | 5/2004 | Mandelbaum et al. |
| 2004/0127156 A1 | 7/2004 | Park |
| 2004/0128070 A1 | 7/2004 | Schmidt et al. |
| 2004/0157612 A1 | 8/2004 | Kim |
| 2004/0165788 A1 | 8/2004 | Perez et al. |
| 2004/0169860 A1 | 9/2004 | Jung et al. |
| 2004/0207036 A1 | 10/2004 | Ikeda |
| 2004/0256561 A1 | 12/2004 | Beuhler et al. |
| 2005/0030314 A1 | 2/2005 | Dawson |
| 2005/0067852 A1 | 3/2005 | Jeong |
| 2005/0068333 A1 | 3/2005 | Nakahashi et al. |
| 2005/0089241 A1 | 4/2005 | Kawanishi et al. |
| 2005/0093890 A1 | 5/2005 | Baudisch |
| 2005/0110803 A1 | 5/2005 | Sugimura |
| 2005/0138569 A1 | 6/2005 | Baxter et al. |
| 2005/0169655 A1 | 8/2005 | Koyama et al. |
| 2005/0184993 A1 | 8/2005 | Ludwin et al. |
| 2005/0213813 A1 | 9/2005 | Lin et al. |
| 2005/0213853 A1 | 9/2005 | Maier et al. |
| 2005/0219249 A1 | 10/2005 | Xie et al. |
| 2005/0248912 A1 | 11/2005 | Kang et al. |
| 2005/0265688 A1 | 12/2005 | Kobayashi |
| 2005/0270784 A1 | 12/2005 | Hahn et al. |
| 2005/0277447 A1 | 12/2005 | Buil et al. |
| 2006/0039686 A1 | 2/2006 | Soh et al. |
| 2006/0060984 A1 | 3/2006 | Wakabayashi et al. |
| 2006/0077246 A1 | 4/2006 | Kawakami et al. |
| 2006/0097172 A1 | 5/2006 | Park |
| 2006/0120712 A1 | 6/2006 | Kim |
| 2006/0132642 A1 | 6/2006 | Hosaka et al. |
| 2006/0140501 A1 | 6/2006 | Tadas |
| 2006/0147191 A1 | 7/2006 | Kim |
| 2006/0154559 A1 | 7/2006 | Yoshida |
| 2006/0210249 A1 | 9/2006 | Seto |
| 2006/0234744 A1 | 10/2006 | Sung et al. |
| 2006/0240867 A1 | 10/2006 | Wang et al. |
| 2006/0262210 A1 | 11/2006 | Smith et al. |
| 2006/0279632 A1 | 12/2006 | Anderson |
| 2006/0279758 A1 | 12/2006 | Myoki |
| 2006/0285907 A1 | 12/2006 | Kang et al. |
| 2007/0004449 A1 | 1/2007 | Sham |
| 2007/0019077 A1 | 1/2007 | Park |
| 2007/0019099 A1 | 1/2007 | Lieberman et al. |
| 2007/0019103 A1 | 1/2007 | Lieberman et al. |

(56) References Cited

U.S. PATENT DOCUMENTS

| | | |
|---|---|---|
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0189583 A1 | 8/2007 | Shimada et al. |
| 2007/0211965 A1 | 9/2007 | Helbing et al. |
| 2007/0216786 A1 | 9/2007 | Hung et al. |
| 2007/0222798 A1 | 9/2007 | Kuno |
| 2007/0247611 A1 | 10/2007 | Tamaki et al. |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0211916 A1 | 9/2008 | Ono |
| 2008/0218474 A1 | 9/2008 | Ahn et al. |
| 2008/0248833 A1 | 10/2008 | Silverbrook et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0129700 A1 | 5/2009 | Rother et al. |
| 2009/0131104 A1 | 5/2009 | Yoon |
| 2009/0141124 A1 | 6/2009 | Liu et al. |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0257679 A1 | 10/2009 | Hogasten |
| 2009/0278048 A1 | 11/2009 | Choe et al. |
| 2009/0297062 A1 | 12/2009 | Molne et al. |
| 2010/0066866 A1 | 3/2010 | Lim |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0163730 A1 | 7/2010 | Schmidt et al. |
| 2010/0165122 A1 | 7/2010 | Castorina et al. |
| 2010/0220193 A1 | 9/2010 | Hogasten et al. |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121178 A1 | 5/2011 | Strandemar |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2012/0007987 A1 | 1/2012 | Gaber |
| 2012/0083314 A1 | 4/2012 | Ng et al. |
| 2012/0091340 A1 | 4/2012 | Young |
| 2012/0184252 A1 | 7/2012 | Hirsch |
| 2012/0229650 A1 | 9/2012 | Matthews |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0320086 A1 | 12/2012 | Kasama et al. |
| 2013/0204570 A1 | 8/2013 | Mendelson et al. |
| 2013/0320220 A1 | 12/2013 | Donowsky |

FOREIGN PATENT DOCUMENTS

| | | |
|---|---|---|
| CN | 2874947 | 2/2007 |
| CN | 2899321 | 5/2007 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 2477391 | 7/2012 |
| EP | 2533226 | 12/2012 |
| JP | 1997275518 | 4/1999 |
| JP | 2002344814 | 11/2002 |
| JP | 2004048571 | 2/2004 |
| JP | 2006098098 | 4/2006 |
| JP | 2006105655 | 4/2006 |
| JP | 2007006475 | 1/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20060071220 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |

(56) References Cited

FOREIGN PATENT DOCUMENTS

| | | |
|---|---|---|
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 100645746 | 5/2006 |
| KR | 20060054877 | 5/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 1006660 | 1/2011 |
| KR | 20110006437 | 1/2011 |
| KR | 20110011264 | 2/2011 |
| KR | 2011019994 | 3/2011 |
| KR | 2011024290 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 02/067575 | 8/2002 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2008/094102 | 8/2008 |
| WO | WO 2009/122114 | 10/2009 |

(56) References Cited

FOREIGN PATENT DOCUMENTS

| WO | WO 2010/005152 | 1/2010 |
| WO | WO 2010/033142 | 3/2010 |
| WO | WO 2011131758 | 10/2011 |
| WO | WO 2012027739 | 3/2012 |
| WO | WO 2012/170949 | 12/2012 |
| WO | WO 2012/170953 | 12/2012 |
| WO | WO 2012170946 | 12/2012 |

OTHER PUBLICATIONS

DARPA, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

Neto et al., "Figures of merit and optimization of a $VO_2$ microbolometer with strong electrothermal feedback", SPIE, Jul. 1, 2008, pp. 1-15, vol. 47, No. 7, Bellingham, WA.

Tzimopoulou et al., "Scene based techniques for nonuniformity correction of infrared focal plane arrays", Proceedings of SPIE, Jul. 19, 1998, pp. 172-183, vol. 3436, International Society for Optical Engineering, US.

Perry, Greg, "Counters and Accumulators, Absolute Beginner's Guide to Programming" [online], Apr. 2001[retrieved on May 19, 2014]. Retrieved from the Internet: <URL: www.safaribooksonline.com>.

ROW AND COLUMN NOISE REDUCTION IN THERMAL IMAGES

CROSS-REFERENCE TO RELATED APPLICATIONS

This application claims the benefit of U.S. Provisional Patent Application No. 61/745,489 filed Dec. 21, 2012 and entitled "ROW AND COLUMN NOISE REDUCTION IN THERMAL IMAGES" which is hereby incorporated by reference in its entirety.

This application claims the benefit of U.S. Provisional Patent Application No. 61/745,504 filed Dec. 21, 2012 and entitled "PIXEL-WISE NOISE REDUCTION IN THERMAL IMAGES" which is hereby incorporated by reference in its entirety.

This application is a continuation-in-part application of U.S. patent application Ser. No. 13/622,178 filed Sep. 18, 2012 and entitled "SYSTEMS AND METHODS FOR PROCESSING INFRARED IMAGES", which is a continuation-in-part application of U.S. patent application Ser. No. 13/529, 772 filed Jun. 21, 2012 and entitled "SYSTEMS AND METHODS FOR PROCESSING INFRARED IMAGES", which is a continuation application of U.S. patent application Ser. No. 12/396,340 filed Mar. 2, 2009 and entitled "SYSTEMS AND METHODS FOR PROCESSING INFRARED IMAGES", all of which are hereby incorporated by reference in their entirety.

This application is a continuation-in-part of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

TECHNICAL FIELD

One or more embodiments of the invention relate generally to thermal imaging devices and more particularly, for example, to techniques to reduce noise in thermal images.

BACKGROUND

Infrared imaging devices (e.g., thermal imagers) often suffer from various types of noise, such as high spatial frequency fixed pattern noise (FPN). Some FPN may be correlated to rows and/or columns of infrared sensors. For example, FPN noise that appears as column noise may be caused by variations in column amplifiers and include a 1/f component. Such column noise can inhibit the ability to distinguish between desired vertical features of a scene and vertical FPN. Other FPN may be spatially uncorrelated, such as noise caused by pixel to pixel signal drift which may also include a 1/f component.

One conventional approach to removing FPN relies on an internal or external shutter that is selectively placed in front of infrared sensors of an infrared imaging device to provide a substantially uniform scene. The infrared sensors may be calibrated based on images captured of the substantially uniform scene while the shutter is positioned in front of the infrared sensors. Unfortunately, such a shutter may be prone to mechanical failure and potential non-uniformities (e.g., due to changes in temperature or other factors) which render it difficult to implement. Moreover, in applications where infrared imaging devices with small form factors may be desired, a shutter can increase the size and cost of such devices.

SUMMARY

In one embodiment, a method includes receiving an image frame comprising a plurality of pixels arranged in a plurality of rows and columns, wherein the pixels comprise thermal image data associated with a scene and noise introduced by an infrared imaging device; and processing the image frame to determine a plurality of column correction terms to reduce at least a portion of the noise, wherein each column correction term is associated with a corresponding one of the columns and is determined based on relative relationships between the pixels of the corresponding column and the pixels of a neighborhood of columns.

In another embodiment, a system includes a memory component adapted to receive an image frame comprising a plurality of pixels arranged in a plurality of rows and columns, wherein the pixels comprise thermal image data associated with a scene and noise introduced by an infrared imaging device; and a processor adapted to execute instructions to process the image frame to determine a plurality of column correction terms to reduce at least a portion of the noise, wherein each column correction term is associated with a corresponding one of the columns and is determined based on relative relationships between the pixels of the corresponding column and the pixels of a neighborhood of columns.

In another embodiment, a method includes receiving an image frame comprising a plurality of pixels arranged in a plurality of rows and columns, wherein the pixels comprise thermal image data associated with a scene and noise introduced by an infrared imaging device; and processing the image frame to determine a plurality of non-uniformity correction (NUC) terms to reduce at least a portion of the noise, wherein each NUC term is associated with a corresponding one of the pixels and is determined based on relative relationships between the corresponding one of the pixels and associated neighborhood pixels within a selected distance from the corresponding one of the pixels.

In another embodiment, a system includes a memory component adapted to receive an image frame comprising a plurality of pixels arranged in a plurality of rows and columns, wherein the pixels comprise thermal image data associated with a scene and noise introduced by an infrared imaging device; and a processor adapted to execute instructions to process the image frame to determine a plurality of non-uniformity correction (NUC) terms to reduce at least a portion of the noise, wherein each NUC term is associated with a corresponding one of the pixels and is determined based on relative relationships between the corresponding one of the pixels and associated neighborhood pixels within a selected distance from the corresponding one of the pixels.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
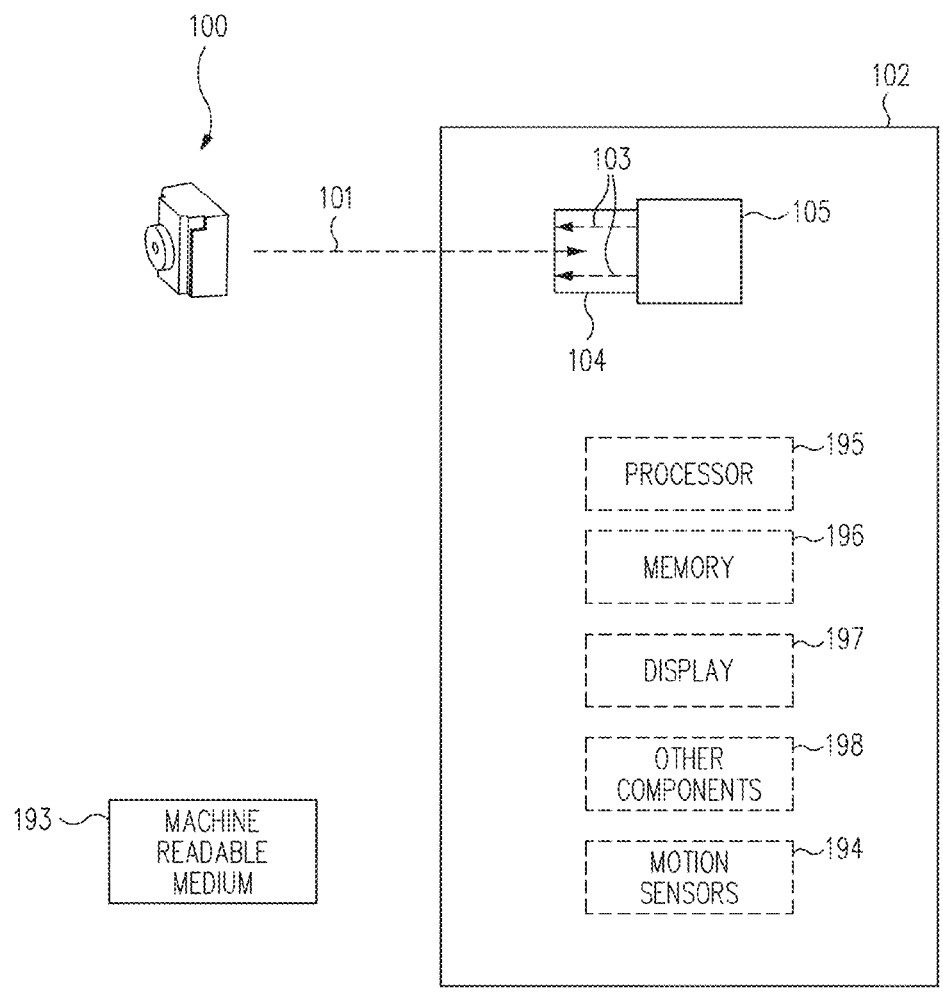
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device. In this regard, infrared imaging module 100 may be used to provide infrared imaging features to host device 102. For example, infrared imaging module 100 may be configured to capture, process, and/or otherwise manage infrared images (e.g., also referred to as image frames) and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
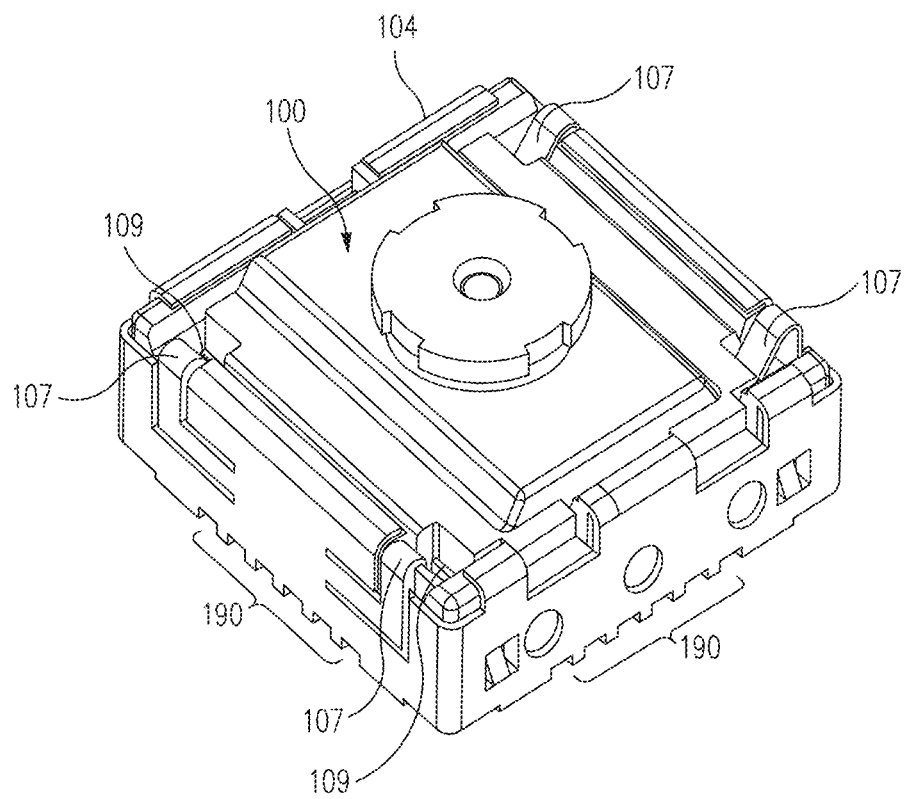
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
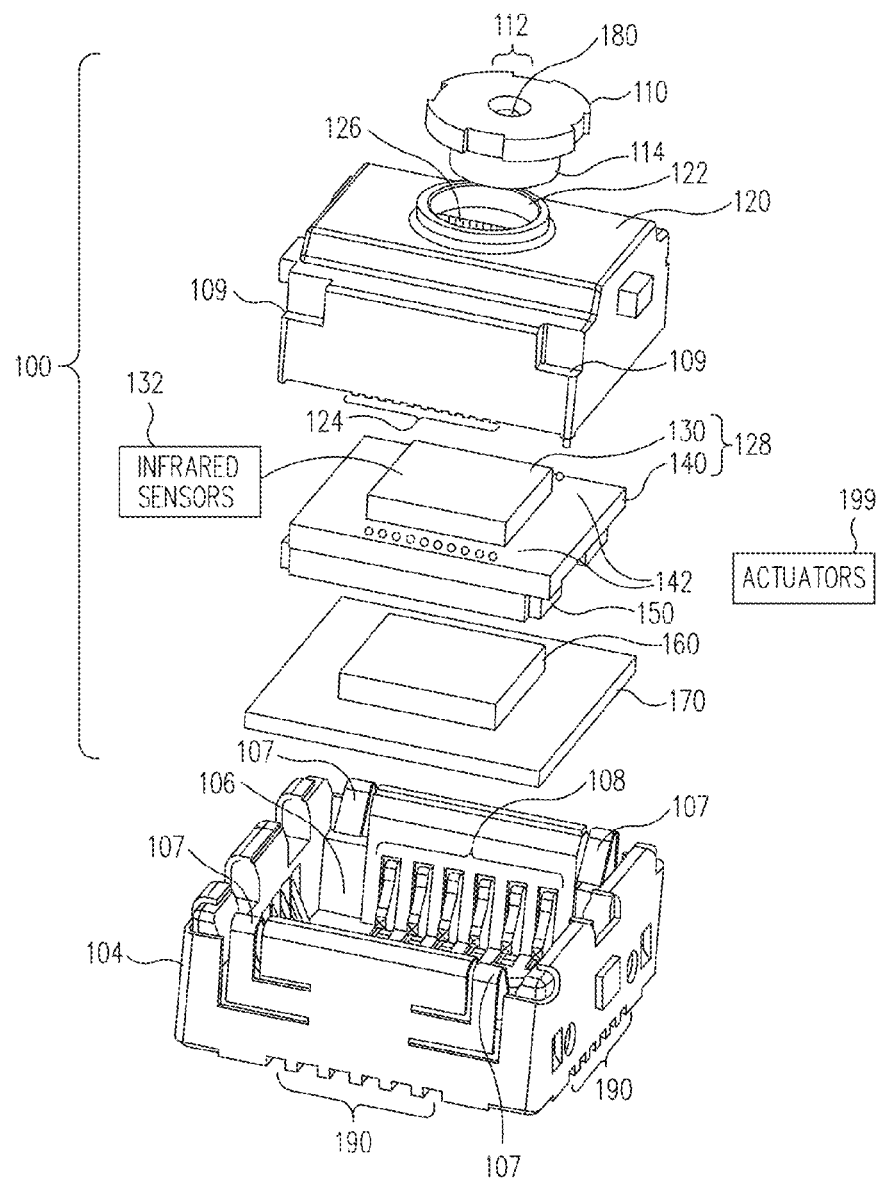
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIG. 3. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROTC (e.g., within a wafer level package), less die area may be consumed and fewer discrete die (or chips) are needed.

Figure 4:
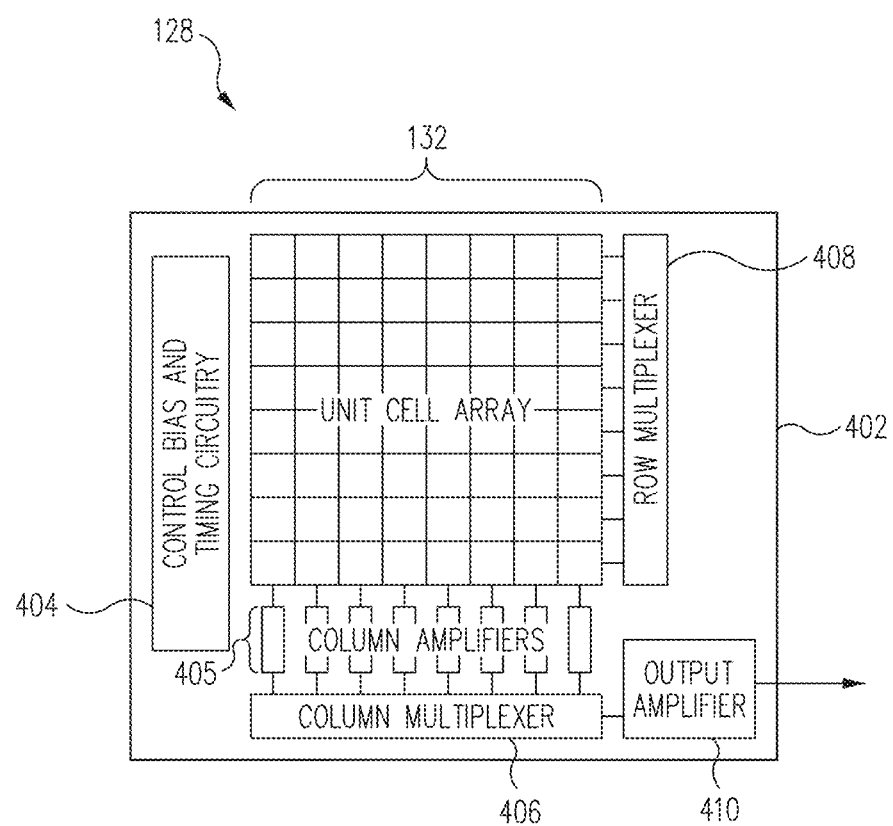
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROTC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
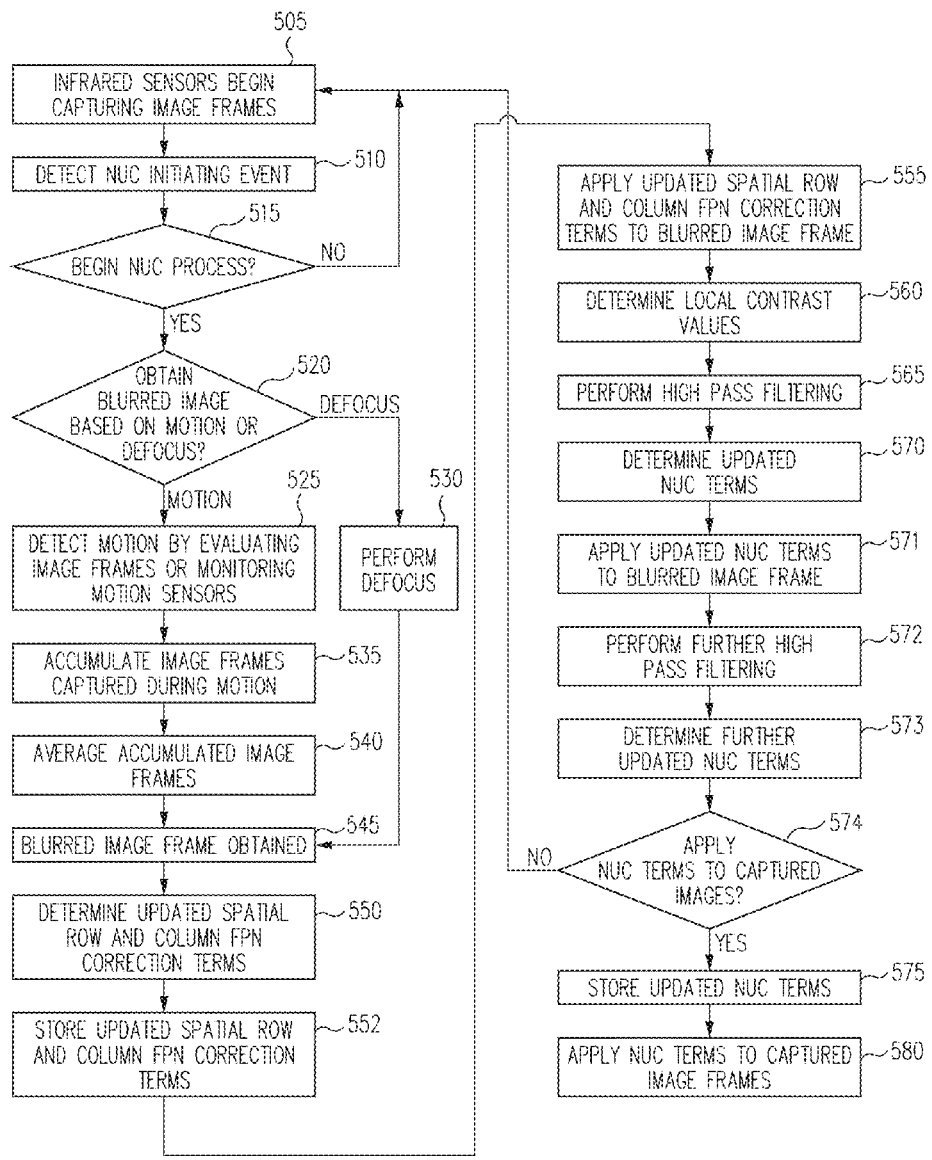
FIG. 5 illustrates a flow diagram of various operations to determine non-uniformity correction (NUC) terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is detected (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. Tithe motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROTC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
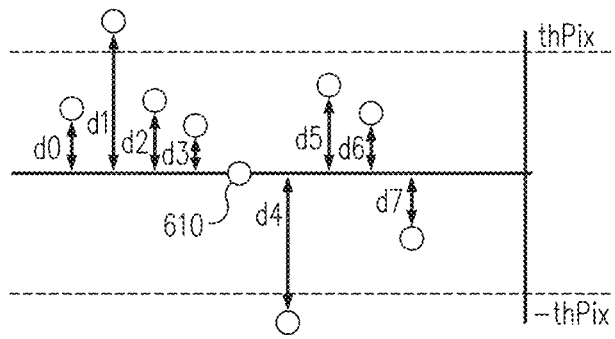
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
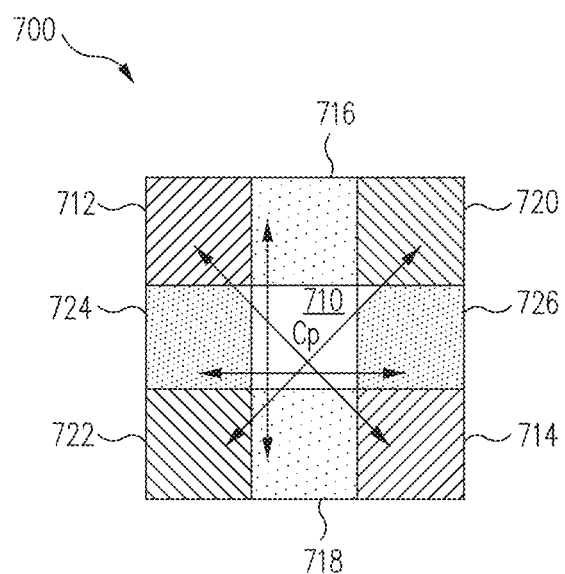
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor $\lambda$ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW} = \lambda \cdot NUC_{OLD} + (1-\lambda) \cdot (NUC_{OLD} + NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
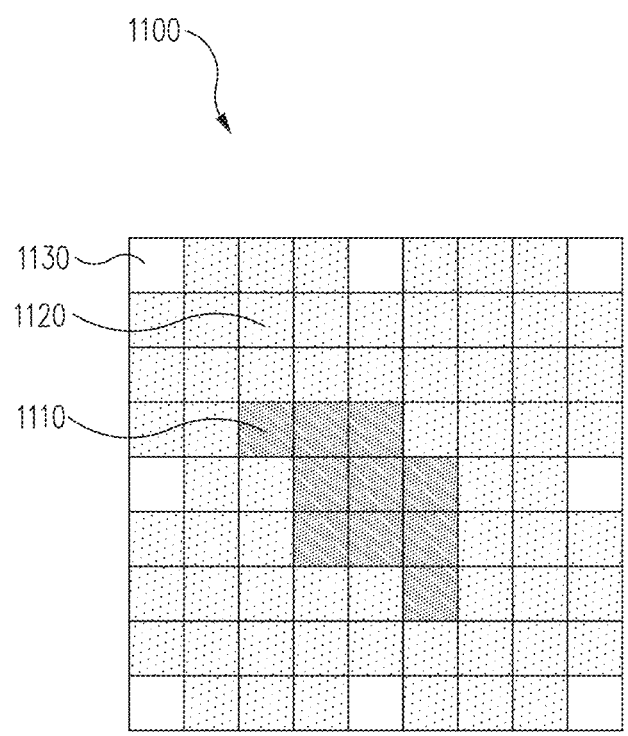
FIG. 11 illustrates spatially correlated fixed pattern noise (FPN) in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor λ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
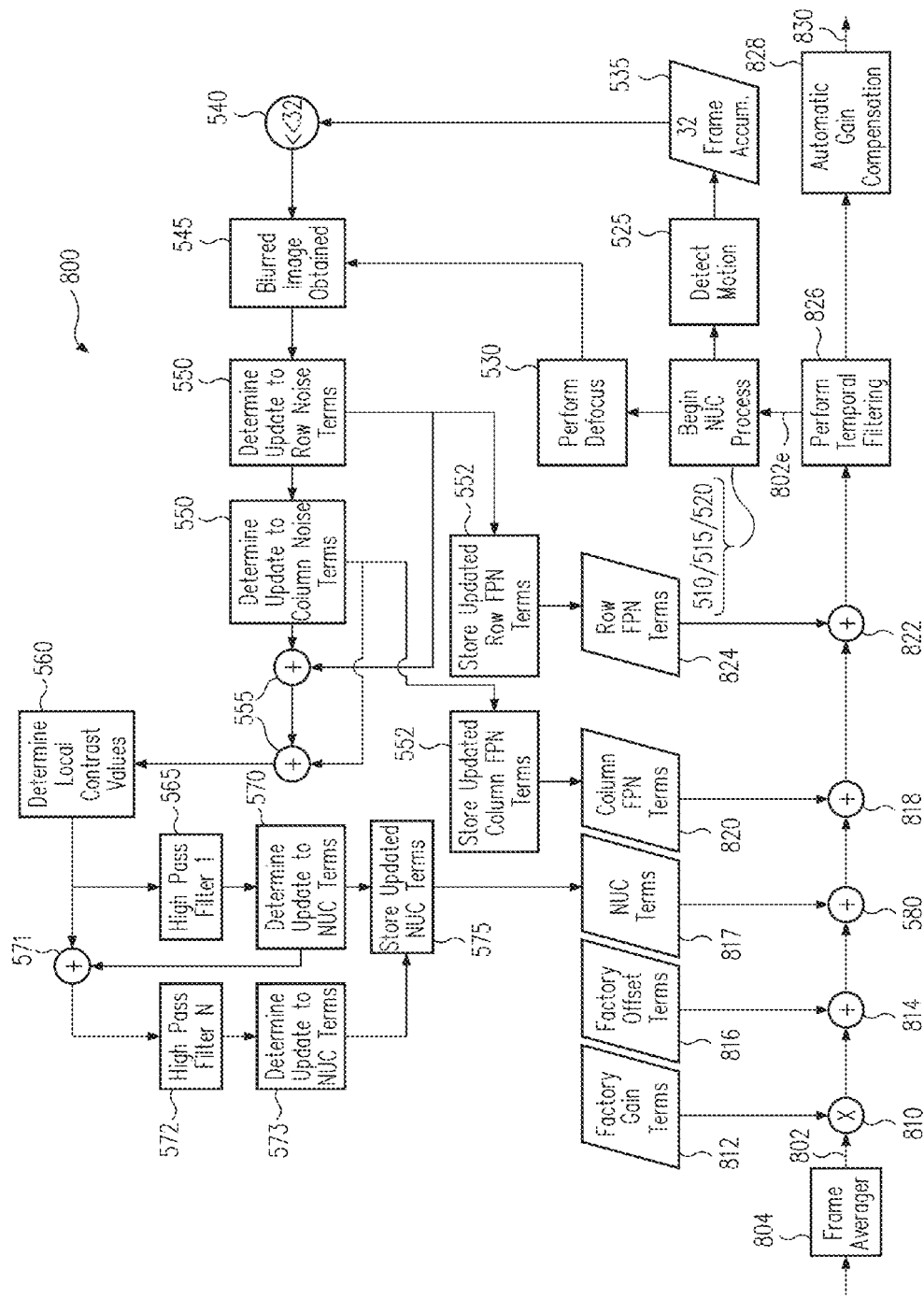
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
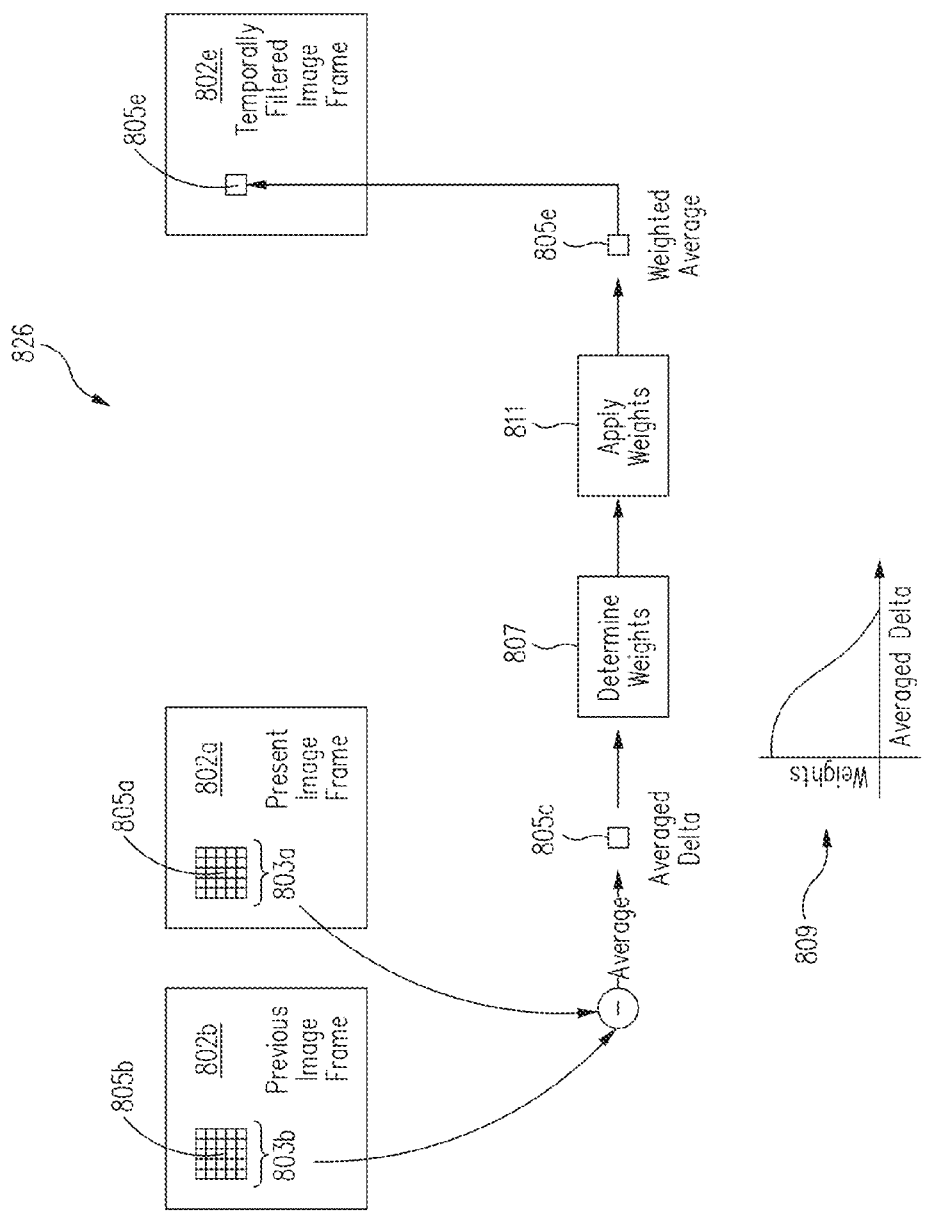
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
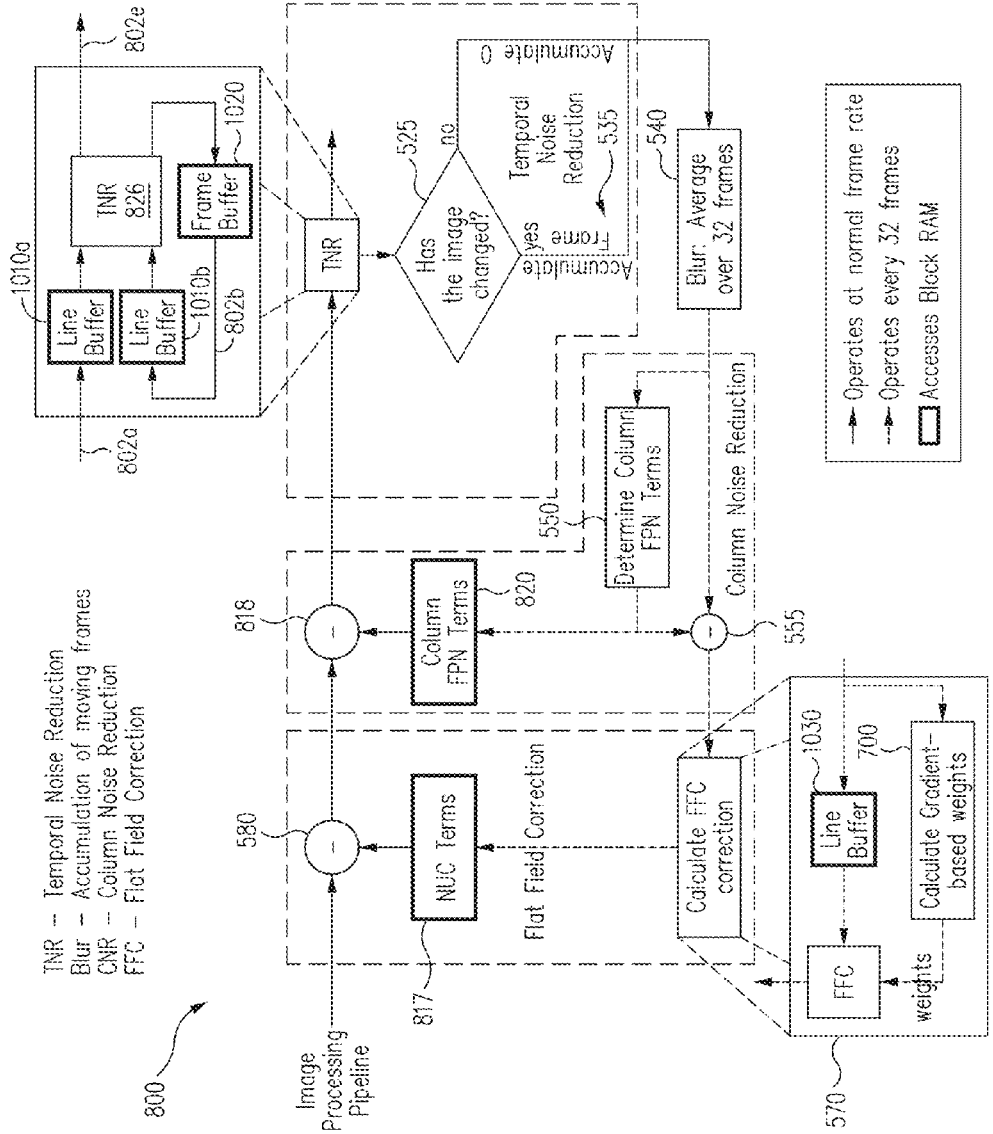
FIG. 10 illustrates particular implementation details of several processes of the image processing pipeline of FIG. 8 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC teems as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is ⅓₂ of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

As discussed, in various embodiments, infrared imaging module 100 may be configured to operate at low voltage levels. In particular, infrared imaging module 100 may be implemented with circuitry configured to operate at low power and/or in accordance with other parameters that permit infrared imaging module 100 to be conveniently and effectively implemented in various types of host devices 102, such as mobile devices and other devices.

Figure 12:
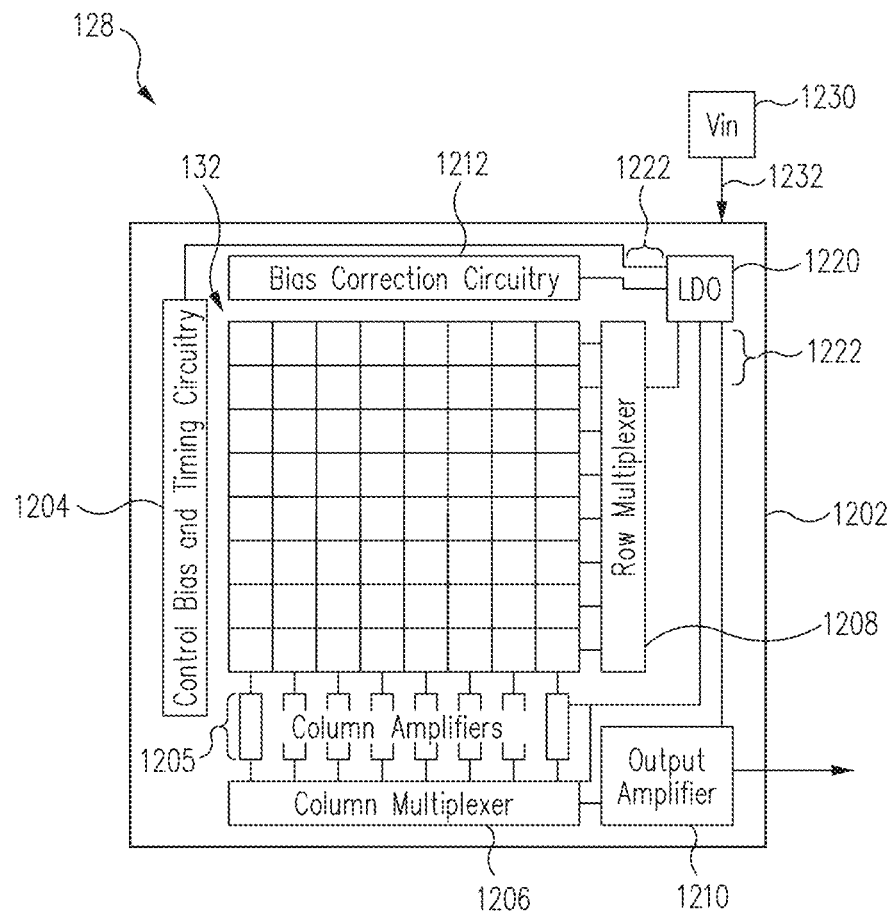
FIG. 12 illustrates a block diagram of another implementation of an infrared sensor assembly including an array of infrared sensors and a low-dropout regulator in accordance with an embodiment of the disclosure.

For example, FIG. 12 illustrates a block diagram of another implementation of infrared sensor assembly 128 including infrared sensors 132 and an LDO 1220 in accordance with an embodiment of the disclosure. As shown, FIG. 12 also illustrates various components 1202, 1204, 1205, 1206, 1208, and 1210 which may implemented in the same or similar manner as corresponding components previously described with regard to FIG. 4. FIG. 12 also illustrates bias correction circuitry 1212 which may be used to adjust one or more bias voltages provided to infrared sensors 132 (e.g., to compensate for temperature changes, self-heating, and/or other factors).

In some embodiments, LDO 1220 may be provided as part of infrared sensor assembly 128 (e.g., on the same chip and/or wafer level package as the ROTC). For example, LDO 1220 may be provided as part of an FPA with infrared sensor assembly 128. As discussed, such implementations may reduce power supply noise introduced to infrared sensor assembly 128 and thus provide an improved PSRR. In addition, by implementing the LDO with the ROIC, less die area may be consumed and fewer discrete die (or chips) are needed.

LDO 1220 receives an input voltage provided by a power source 1230 over a supply line 1232. LDO 1220 provides an output voltage to various components of infrared sensor assembly 128 over supply lines 1222. In this regard, LDO 1220 may provide substantially identical regulated output voltages to various components of infrared sensor assembly 128 in response to a single input voltage received from power source 1230.

For example, in some embodiments, power source 1230 may provide an input voltage in a range of approximately 2.8 volts to approximately 11 volts (e.g., approximately 2.8 volts in one embodiment), and LDO 1220 may provide an output voltage in a range of approximately 1.5 volts to approximately 2.8 volts (e.g., approximately 2.5 volts in one embodiment). In this regard, LDO 1220 may be used to provide a consistent regulated output voltage, regardless of whether power source 1230 is implemented with a conventional voltage range of approximately 9 volts to approximately 11 volts, or a low voltage such as approximately 2.8 volts. As such, although various voltage ranges are provided for the input and output voltages, it is contemplated that the output voltage of LDO 1220 will remain fixed despite changes in the input voltage.

The implementation of LDO 1220 as part of infrared sensor assembly 128 provides various advantages over conventional power implementations for FPAs. For example, conventional FPAs typically rely on multiple power sources, each of which may be provided separately to the FPA, and separately distributed to the various components of the FPA. By regulating a single power source 1230 by LDO 1220, appropriate voltages may be separately provided (e.g., to reduce possible noise) to all components of infrared sensor assembly 128 with reduced complexity. The use of LDO 1220 also allows infrared sensor assembly 128 to operate in a consistent manner, even if the input voltage from power source 1230 changes (e.g., if the input voltage increases or decreases as a result of charging or discharging a battery or other type of device used for power source 1230).

The various components of infrared sensor assembly 128 shown in FIG. 12 may also be implemented to operate at lower voltages than conventional devices. For example, as discussed, LDO 1220 may be implemented to provide a low voltage (e.g., approximately 2.5 volts). This contrasts with the multiple higher voltages typically used to power conventional FPAs, such as: approximately 3.3 volts to approximately 5 volts used to power digital circuitry; approximately 3.3 volts used to power analog circuitry; and approximately 9 volts to approximately 11 volts used to power loads. Also, in some embodiments, the use of LDO 1220 may reduce or eliminate the need for a separate negative reference voltage to be provided to infrared sensor assembly 128.

Figure 13:
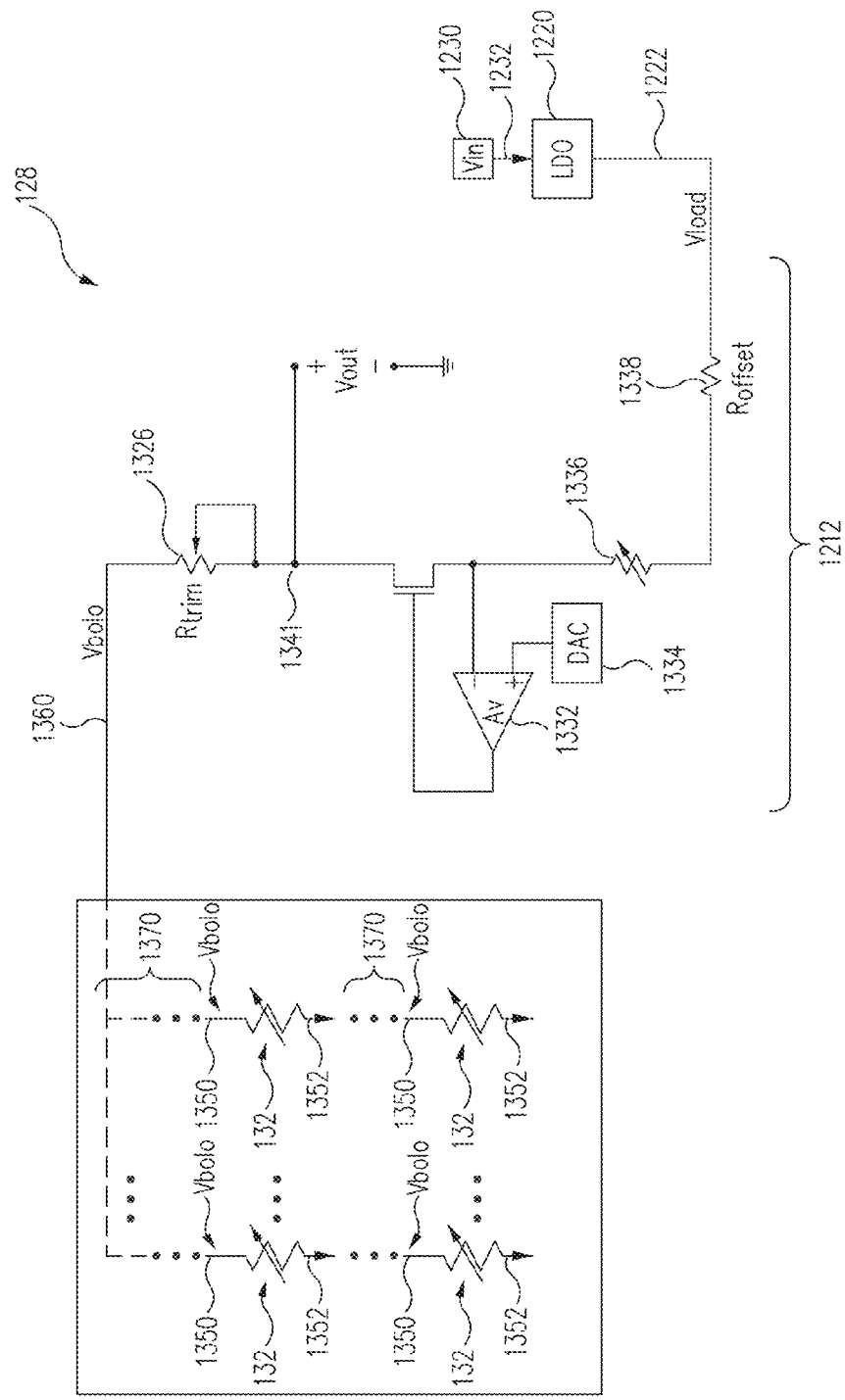
FIG. 13 illustrates a circuit diagram of a portion of the infrared sensor assembly of FIG. 12 in accordance with an embodiment of the disclosure.

Additional aspects of the low voltage operation of infrared sensor assembly 128 may be further understood with reference to FIG. 13. FIG. 13 illustrates a circuit diagram of a portion of infrared sensor assembly 128 of FIG. 12 in accordance with an embodiment of the disclosure. In particular, FIG. 13 illustrates additional components of bias correction circuitry 1212 (e.g., components 1326, 1330, 1332, 1334, 1336, 1338, and 1341) connected to LDO 1220 and infrared sensors 132. For example, bias correction circuitry 1212 may be used to compensate for temperature-dependent changes in bias voltages in accordance with an embodiment of the present disclosure. The operation of such additional components may be further understood with reference to similar components identified in U.S. Pat. No. 7,679,048 issued Mar. 16, 2010 which is hereby incorporated by reference in its entirety Infrared sensor assembly 128 may also be implemented in accordance with the various components identified in U.S. Pat. No. 6,812,465 issued Nov. 2, 2004 which is hereby incorporated by reference in its entirety.

In various embodiments, some or all of the bias correction circuitry 1212 may be implemented on a global array basis as shown in FIG. 13 (e.g., used for all infrared sensors 132 collectively in an array). In other embodiments, some or all of the bias correction circuitry 1212 may be implemented an individual sensor basis (e.g., entirely or partially duplicated for each infrared sensor 132). In some embodiments, bias correction circuitry 1212 and other components of FIG. 13 may be implemented as part of ROIC 1202.

As shown in FIG. 13, LDO 1220 provides a load voltage Vload to bias correction circuitry 1212 along one of supply lines 1222. As discussed, in some embodiments, Vload may be approximately 2.5 volts which contrasts with larger voltages of approximately 9 volts to approximately 11 volts that may be used as load voltages in conventional infrared imaging devices.

Based on Vload, bias correction circuitry 1212 provides a sensor bias voltage Vbolo at a node 1360. Vbolo may be distributed to one or more infrared sensors 132 through appropriate switching circuitry 1370 (e.g., represented by broken lines in FIG. 13). In some examples, switching circuitry 1370 may be implemented in accordance with appropriate components identified in U.S. Pat. Nos. 6,812,465 and 7,679,048 previously referenced herein.

Each infrared sensor 132 includes a node 1350 which receives Vbolo through switching circuitry 1370, and another node 1352 which may be connected to ground, a substrate, and/or a negative reference voltage. In some embodiments, the voltage at node 1360 may be substantially the same as Vbolo provided at nodes 1350. In other embodiments, the voltage at node 1360 may be adjusted to compensate for possible voltage drops associated with switching circuitry 1370 and/or other factors.

Vbolo may be implemented with lower voltages than are typically used for conventional infrared sensor biasing. In one embodiment, Vbolo may be in a range of approximately 0.2 volts to approximately 0.7 volts. In another embodiment, Vbolo may be in a range of approximately 0.4 volts to approximately 0.6 volts. In another embodiment, Vbolo may be approximately 0.5 volts. In contrast, conventional infrared sensors typically use bias voltages of approximately 1 volt.

The use of a lower bias voltage for infrared sensors 132 in accordance with the present disclosure permits infrared sensor assembly 128 to exhibit significantly reduced power consumption in comparison with conventional infrared imaging devices. In particular, the power consumption of each infrared sensor 132 is reduced by the square of the bias voltage. As a result, a reduction from, for example, 1.0 volt to 0.5 volts provides a significant reduction in power, especially when applied to many infrared sensors 132 in an infrared sensor array. This reduction in power may also result in reduced self-heating of infrared sensor assembly 128.

In accordance with additional embodiments of the present disclosure, various techniques are provided for reducing the effects of noise in image frames provided by infrared imaging devices operating at low voltages. In this regard, when infrared sensor assembly 128 is operated with low voltages as described, noise, self-heating, and/or other phenomena may, if uncorrected, become more pronounced in image frames provided by infrared sensor assembly 128.

For example, referring to FIG. 13, when LDO 1220 maintains Vload at a low voltage in the manner described herein, Vbolo will also be maintained at its corresponding low voltage and the relative size of its output signals may be reduced. As a result, noise, self-heating, and/or other phenomena may have a greater effect on the smaller output signals read out from infrared sensors 132, resulting in variations (e.g., errors) in the output signals. If uncorrected, these variations may be exhibited as noise in the image frames. Moreover, although low voltage operation may reduce the overall amount of certain phenomena (e.g., self-heating), the smaller output signals may permit the remaining error sources (e.g., residual self-heating) to have a disproportionate effect on the output signals during low voltage operation.

To compensate for such phenomena, infrared sensor assembly 128, infrared imaging module 100, and/or host device 102 may be implemented with various array sizes, frame rates, and/or frame averaging techniques. For example, as discussed, a variety of different array sizes are contemplated for infrared sensors 132. In some embodiments, infrared sensors 132 may be implemented with array sizes ranging from 32 by 32 to 160 by 120 infrared sensors 132. Other example array sizes include 80 by 64, 80 by 60, 64 by 64, and 64 by 32. Any desired array size may be used.

Advantageously, when implemented with such relatively small array sizes, infrared sensor assembly 128 may provide image frames at relatively high frame rates without requiring significant changes to ROIC and related circuitry. For example, in some embodiments, frame rates may range from approximately 120 Hz to approximately 480 Hz.

In some embodiments, the array size and the frame rate may be scaled relative to each other (e.g., in an inversely proportional manner or otherwise) such that larger arrays are implemented with lower frame rates, and smaller arrays are implemented with higher frame rates. For example, in one embodiment, an array of 160 by 120 may provide a frame rate of approximately 120 Hz. In another embodiment, an array of 80 by 60 may provide a correspondingly higher frame rate of approximately 240 Hz. Other frame rates are also contemplated.

By scaling the array size and the frame rate relative to each other, the particular readout timing of rows and/or columns of the FPA may remain consistent, regardless of the actual FPA size or frame rate. In one embodiment, the readout timing may be approximately 63 microseconds per row or column.

As previously discussed with regard to FIG. 8, the image frames captured by infrared sensors 132 may be provided to a frame averager 804 that integrates multiple image frames to provide image frames 802 (e.g., processed image frames) with a lower frame rate (e.g., approximately 30 Hz, approximately 60 Hz, or other frame rates) and with an improved signal to noise ratio. In particular, by averaging the high frame rate image frames provided by a relatively small FPA, image noise attributable to low voltage operation may be effectively averaged out and/or substantially reduced in image frames 802. Accordingly, infrared sensor assembly 128 may be operated at relatively low voltages provided by LDO 1220 as discussed without experiencing additional noise and related side effects in the resulting image frames 802 after processing by frame averager 804.

Other embodiments are also contemplated. For example, although a single array of infrared sensors 132 is illustrated, it is contemplated that multiple such arrays may be used together to provide higher resolution image frames (e.g., a scene may be imaged across multiple such arrays). Such arrays may be provided in multiple infrared sensor assemblies 128 and/or provided in the same infrared sensor assembly 128. Each such array may be operated at low voltages as described, and also may be provided with associated ROIC circuitry such that each array may still be operated at a relatively high frame rate. The high frame rate image frames provided by such arrays may be averaged by shared or dedicated frame averagers 804 to reduce and/or eliminate noise associated with low voltage operation. As a result, high resolution infrared images may be obtained while still operating at low voltages.

In various embodiments, infrared sensor assembly 128 may be implemented with appropriate dimensions to permit infrared imaging module 100 to be used with a small form factor socket 104, such as a socket used for mobile devices. For example, in some embodiments, infrared sensor assembly 128 may be implemented with a chip size in a range of approximately 4.0 mm by approximately 4.0 mm to approximately 5.5 mm by approximately 5.5 mm (e.g., approximately 4.0 mm by approximately 5.5 mm in one example). Infrared sensor assembly 128 may be implemented with such sizes or other appropriate sizes to permit use with socket 104 implemented with various sizes such as: 8.5 mm by 8.5 mm, 8.5 mm by 5.9 mm, 6.0 mm by 6.0 mm, 5.5 mm by 5.5 mm, 4.5 mm by 4.5 mm, and/or other socket sizes such as, for example, those identified in Table 1 of U.S. Provisional Patent Application No. 61/495,873 previously referenced herein.

As further described with regard to FIGS. 14-23E, various image processing techniques are described which may be applied, for example, to infrared images (e.g., thermal images) to reduce noise within the infrared images (e.g., improve image detail and/or image quality) and/or provide non-uniformity correction.

Although FIGS. 14-23E will be primarily described with regard to a system 2100, the described techniques may be performed by processing module 160 or processor 195 (both also generally referred to as a processor) operating on image frames captured by infrared sensors 132, and vice versa.

In some embodiments, the techniques described with regard to FIGS. 14-22B be used to perform operations of block 550 (see FIGS. 5 and 8) to determine row and/or column FPN terms. For example, such techniques may be applied to intentionally blurred images provided by block 545 of FIGS. 5 and 8. In some embodiments, the techniques described with regard to FIGS. 23A-E may be used in place of and/or in addition to the operations of blocks 565-573 (see FIGS. 5 and 8) to estimate FPN and/or determine NUC terms.

Referring now to FIGS. 14-22B, a significant portion of noise may be defined as row and column noise. This type of noise may be explained by non-linearities in a Read Out Integrated Circuit (ROIC). This type of noise, if not eliminated, may manifest as vertical and horizontal stripes in the final image and human observers are particularly sensitive to these types of image artifacts. Other systems relying on imagery from infrared sensors, such as, for example, automatic target trackers may also suffer from performance degradation, if row and column noise is present.

Because of non-linear behavior of infrared detectors and read-out integrated circuit (ROTC) assemblies, even when a shutter operation or external black body calibration is performed, there may be residual row and column noise (e.g., the scene being imaged may not have the exact same temperature as the shutter). The amount of row and column noise may increase over time, after offset calibration, increasing asymptotically to some maximum value. In one aspect, this may be referred to as 1/f type noise.

In any given frame, the row and column noise may be viewed as high frequency spatial noise. Conventionally, this type of noise may be reduced using filters in the spatial domain (e.g., local linear or non-linear low pass filters) or the frequency domain (e.g., low pass filters in Fourier or Wavelet space). However, these filters may have negative side effects, such as blurring of the image and potential loss of faint details.

It should be appreciated by those skilled in the art that any reference to a column or a row may include a partial column or a partial row and that the terms "row" and "column" are interchangeable and not limiting. Thus, without departing from the scope of the invention, the term "row" may be used to describe a row or a column, and likewise, the term "column" may be used to describe a row or a column, depending upon the application.

Figure 14:
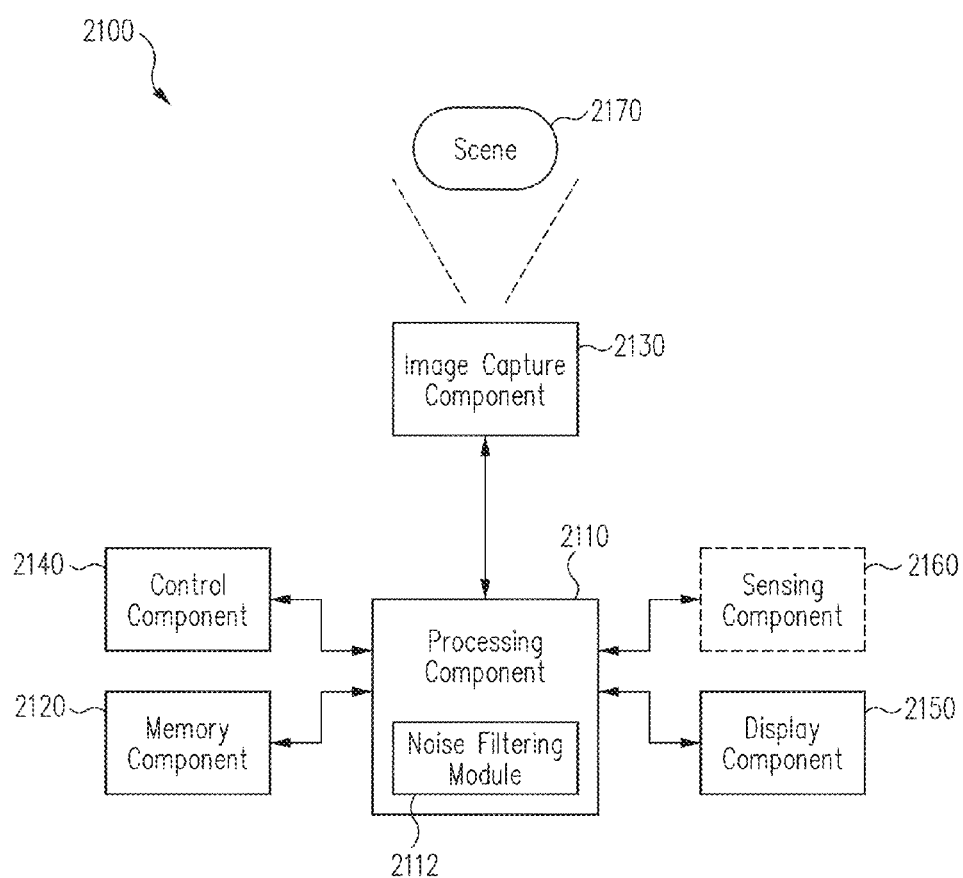
FIG. 14 shows a block diagram of a system for infrared image processing in accordance with an embodiment of the disclosure.

FIG. 14 shows a block diagram of system 2100 (e.g., an infrared camera) for infrared image capturing and processing in accordance with an embodiment. In some embodiments, system 2100 may be implemented by infrared imaging module 100, host device 102, infrared sensor assembly 128, and/or various components described herein (e.g., see FIGS. 1-13). Accordingly, although various techniques are described with regard to system 2100, such techniques may be similarly applied to infrared imaging module 100, host device 102, infrared sensor assembly 128, and/or various components described herein, and vice versa.

The system 2100 comprises, in one implementation, a processing component 2110, a memory component 2120, an image capture component 2130, a control component 2140, and a display component 2150. Optionally, the system 2100 may include a sensing component 2160.

The system 2100 may represent an infrared imaging device, such as an infrared camera, to capture and process images, such as video images of a scene 2170. The system 2100 may represent any type of infrared camera adapted to detect infrared radiation and provide representative data and information (e.g., infrared image data of a scene). For example, the system 2100 may represent an infrared camera that is directed to the near, middle, and/or far infrared spectrums. In another example, the infrared image data may comprise non-uniform data (e.g., real image data that is not from a shutter or black body) of the scene 2170, for processing, as set forth herein. The system 2100 may comprise a portable device and may be incorporated, e.g., into a vehicle (e.g., an automobile or other type of land-based vehicle, an aircraft, or a spacecraft) or a non-mobile installation requiring infrared images to be stored and/or displayed.

In various embodiments, the processing component 2110 comprises a processor, such as one or more of a microprocessor, a single-core processor, a multi-core processor, a microcontroller, a logic device (e.g., a programmable logic device (PLD) configured to perform processing functions), a digital signal processing (DSP) device, etc. The processing component 2110 may be adapted to interface and communicate with components 2120, 2130, 2140, and 2150 to perform method and processing steps and/or operations, as described herein. The processing component 2110 may include a noise filtering module 2112 adapted to implement a noise reduction and/or removal algorithm (e.g., a noise filtering algorithm, such as any of those discussed herein). In one aspect, the processing component 2110 may be adapted to perform various other image processing algorithms including scaling the infrared image data, either as part of or separate from the noise filtering algorithm.

It should be appreciated that noise filtering module 2112 may be integrated in software and/or hardware as part of the processing component 2110, with code (e.g., software or configuration data) for the noise filtering module 2112 stored, e.g., in the memory component 2120. Embodiments of the noise filtering algorithm, as disclosed herein, may be stored by a separate computer-readable medium (e.g., a memory, such as a hard drive, a compact disk, a digital video disk, or a flash memory) to be executed by a computer (e.g., a logic or processor-based system) to perform various methods and operations disclosed herein. In one aspect, the computer-readable medium may be portable and/or located separate from the system 2100, with the stored noise filtering algorithm provided to the system 2100 by coupling the computer-readable medium to the system 2100 and/or by the system 2100 downloading (e.g., via a wired link and/or a wireless link) the noise filtering algorithm from the computer-readable medium.

The memory component 2120 comprises, in one embodiment, one or more memory devices adapted to store data and information, including infrared data and information. The memory device 2120 may comprise one or more various types of memory devices including volatile and non-volatile memory devices, such as RAM (Random Access Memory), ROM (Read-Only Memory), EEPROM (Electrically-Erasable Read-Only Memory), flash memory, etc. The processing component 2110 may be adapted to execute software stored in the memory component 2120 so as to perform method and process steps and/or operations described herein.

The image capture component 2130 comprises, in one embodiment, one or more infrared sensors (e.g., any type of multi-pixel infrared detector, such as a focal plane array) for capturing infrared image data (e.g., still image data and/or video data) representative of an image, such as scene 2170. In one implementation, the infrared sensors of the image capture component 2130 provide for representing (e.g., converting) the captured image data as digital data (e.g., via an analog-to-digital converter included as part of the infrared sensor or separate from the infrared sensor as part of the system 2100). In one aspect, the infrared image data (e.g., infrared video data) may comprise non-uniform data (e.g., real image data) of an image, such as scene 2170. The processing component 2110 may be adapted to process the infrared image data (e.g., to provide processed image data), store the infrared image data in the memory component 2120, and/or retrieve stored infrared image data from the memory component 2120. For example, the processing component 2110 may be adapted to process infrared image data stored in the memory component 2120 to provide processed image data and information (e.g., captured and/or processed infrared image data).

The control component 2140 comprises, in one embodiment, a user input and/or interface device, such as a rotatable knob (e.g., potentiometer), push buttons, slide bar, keyboard, etc., that is adapted to generate a user input control signal. The processing component 2110 may be adapted to sense control input signals from a user via the control component 2140 and respond to any sensed control input signals received therefrom. The processing component 2110 may be adapted to interpret such a control input signal as a value, as generally understood by one skilled in the art.

In one embodiment, the control component 2140 may comprise a control unit (e.g., a wired or wireless handheld control unit) having push buttons adapted to interface with a user and receive user input control values. In one implementation, the push buttons of the control unit may be used to control various functions of the system 2100, such as autofocus, menu enable and selection, field of view, brightness, contrast, noise filtering, high pass filtering, low pass filtering, and/or various other features as understood by one skilled in the art. In another implementation, one or more of the push buttons may be used to provide input values (e.g., one or more noise filter values, adjustment parameters, characteristics, etc.) for a noise filter algorithm. For example, one or more push buttons may be used to adjust noise filtering characteristics of infrared images captured and/or processed by the system 2100.

The display component 2150 comprises, in one embodiment, an image display device (e.g., a liquid crystal display (LCD)) or various other types of generally known video displays or monitors. The processing component 2110 may be adapted to display image data and information on the display component 2150. The processing component 2110 may be adapted to retrieve image data and information from the memory component 2120 and display any retrieved image data and information on the display component 2150. The display component 2150 may comprise display electronics, which may be utilized by the processing component 2110 to display image data and information (e.g., infrared images). The display component 2150 may be adapted to receive image data and information directly from the image capture component 2130 via the processing component 2110, or the image data and information may be transferred from the memory component 2120 via the processing component 2110.

The optional sensing component 2160 comprises, in one embodiment, one or more sensors of various types, depending on the application or implementation requirements, as would be understood by one skilled in the art. The sensors of the optional sensing component 2160 provide data and/or information to at least the processing component 2110. In one aspect, the processing component 2110 may be adapted to communicate with the sensing component 2160 (e.g., by receiving sensor information from the sensing component 2160) and with the image capture component 2130 (e.g., by receiving data and information from the image capture component 2130 and providing and/or receiving command, control, and/or other information to and/or from one or more other components of the system 2100).

In various implementations, the sensing component 2160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. The sensing component 2160 may represent conventional sensors as generally known by one skilled in the art for monitoring various conditions (e.g., environmental conditions) that may have an effect (e.g., on the image appearance) on the data provided by the image capture component 2130.

In some implementations, the optional sensing component 2160 (e.g., one or more of sensors) may comprise devices that relay information to the processing component 2110 via wired and/or wireless communication. For example, the optional sensing component 2160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of the system 2100 may be combined and/or implemented or not, as desired or depending on the application or requirements, with the system 2100 representing various functional blocks of a related system. In one example, the processing component 2110 may be combined with the memory component 2120, the image capture component 2130, the display component 2150, and/or the optional sensing component 2160. In another example, the processing component 2110 may be combined with the image capture component 2130 with only certain functions of the processing component 2110 performed by circuitry (e.g., a processor, a microprocessor, a logic device, a microcontroller, etc.) within the image capture component 2130. Furthermore, various components of the system 2100 may be remote from each other (e.g., image capture component 2130 may comprise a remote sensor with processing component 2110, etc. representing a computer that may or may not be in communication with the image capture component 2130).

Figure 15A:
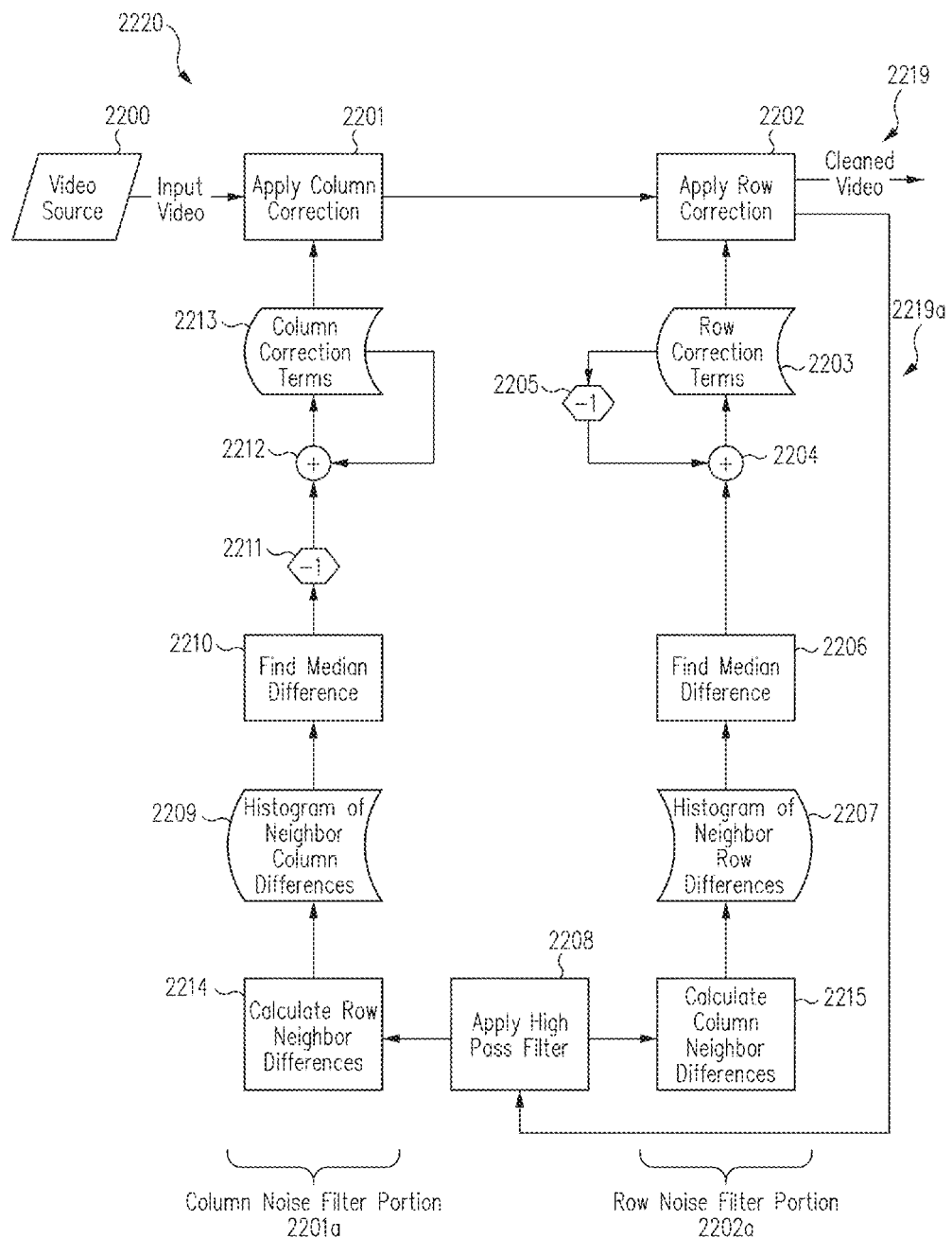
FIGS. 15A-C are flowcharts illustrating methods for noise filtering an infrared image in accordance with embodiments of the disclosure.

In accordance with an embodiment of the disclosure, FIG. 15A shows a method 2220 for noise filtering an infrared image. In one implementation, this method 2220 relates to the reduction and/or removal of temporal, 1/f, and/or fixed spatial noise in infrared imaging devices, such as infrared imaging system 2100 of FIG. 14. The method 2220 is adapted to utilize the row and column based noise components of infrared image data in a noise filtering algorithm. In one aspect, the row and column based noise components may dominate the noise in imagery of infrared sensors (e.g., approximately ⅔ of the total noise may be spatial in a typical micro-bolometer based system).

In one embodiment, the method 2220 of FIG. 15A comprises a high level block diagram of row and column noise filtering algorithms. In one aspect, the row and column noise filter algorithms may be optimized to use minimal hardware resources.

Referring to FIG. 15A, the process flow of the method 2220 implements a recursive mode of operation, wherein the previous correction terms are applied before calculating row and column noise, which may allow for correction of lower spatial frequencies. In one aspect, the recursive approach is useful when row and column noise is spatially correlated. This is sometimes referred to as banding and, in the column noise case, may manifest as several neighboring columns being affected by a similar offset error. When several neighbors used in difference calculations are subject to similar error, the mean difference used to calculate the error may be skewed, and the error may only be partially corrected. By applying partial correction prior to calculating the error in the current frame, correction of the error may be recursively reduced until the error is minimized or eliminated. In the recursive case, if the HPF is not applied (block 2208), then natural gradients as part of the image may, after several iterations, be distorted when merged into the noise model. In one aspect, a natural horizontal gradient may appear as low spatially correlated column noise (e.g., severe banding). In another aspect, the HPF may prevent very low frequency scene information to interfere with the noise estimate and, therefore, limits the negative effects of recursive filtering.

Referring to method 2220 of FIG. 15A, infrared image data (e.g., a raw video source, such as from the image capture component 2130 of FIG. 14) is received as input video data (block 2200). Next, column correction terms are applied to the input video data (block 2201), and row correction terms are applied to the input video data (block 2202). Next, video data (e.g., "cleaned" video data) is provided as output video data (2219) after column and row corrections are applied to the input video data. In one aspect, the term "cleaned" may refer to removing or reducing noise (blocks 2201, 2202) from the input video data via, e.g., one or more embodiments of the noise filter algorithm.

Referring to the processing portion (e.g., recursive processing) of FIG. 15A, a HPF is applied (block 2208) to the output video data 2219 via data signal path 2219a. In one implementation, the high pass filtered data is separately provided to a column noise filter portion 2201a and a row noise filter portion 2202a.

Referring to the column noise filter portion 2201a, the method 2220 may be adapted to process the input video data 2200 and/or output video data 2219 as follows:

1. Apply previous column noise correction terms to a current frame as calculated in a previous frame (block 2201).

2. High pass filter the row of the current frame by subtracting the result of a low pass filter (LPF) operation (block 2208), for example, as discussed in reference to FIGS. 16A-16C.

3. For each pixel, calculate a difference between a center pixel and one or more (e.g., eight) nearest neighbors (block 2214). In one implementation, the nearest neighbors comprise one or more nearest horizontal neighbors. The nearest neighbors may include one or more vertical or other non-horizontal neighbors (e.g., not pure horizontal, i.e., on the same row), without departing from the scope of the invention.

4. If the calculated difference is below a predefined threshold, add the calculated difference to a histogram of differences for the specific column (block 2209).

5. At an end of the current frame, find a median difference by examining a cumulative histogram of differences (block 2210). In one aspect, for added robustness, only differences with some specified minimum number of occurrences may be used.

6. Delay the current correction terms for one frame (block 2211), i.e., they are applied to the next frame.

7. Add median difference (block 2212) to previous column correction terms to provide updated column correction terms (block 2213).

8. Apply updated column noise correction terms in the next frame (block 2201).

Referring to the row noise filter portion 2202a, the method 2220 may be adapted to process the input video data 2200 and/or output video data 2219 as follows:

1. Apply previous row noise correction terms to a current frame as calculated in a previous frame (block 2202).

2. High pass filter the column of the current frame by subtracting the result of a low pass filter (LPF) operation (block 2208), as discussed similarly above for column noise filter portion 2201a.

3. For each pixel, calculate a difference between a center pixel and one or more (e.g., eight) nearest neighbors (block 2215). In one implementation, the nearest neighbors comprise one or more nearest vertical neighbors. The nearest neighbors may include one or more horizontal or other non-vertical neighbors (e.g., not pure vertical, i.e., on the same column), without departing from the scope of the invention.

4. If the calculated difference is below a predefined threshold, add the calculated difference to a histogram of differences for the specific row (block 2207).

5. At an end of the current row (e.g., line), find a median difference by examining a cumulative histogram of differences (block 2206). In one aspect, for added robustness only differences with some specified minimum number of occurrences may be used.

6. Delay the current frame by a time period equivalent to the number of nearest vertical neighbors used, for example eight.

7. Add median difference (block 2204) to row correction terms (block 2203) from previous frame (block 2205).

8. Apply updated row noise correction terms in the current frame (block 2202). In one aspect, this may require a row buffer (e.g., as mentioned in 6).

In one aspect, for all pixels (or at least a large subset of them) in each column, an identical offset term (or set of terms) may be applied for each associated column. This may prevent the filter from blurring spatially local details.

Similarly, in one aspect, for all pixels (or at least a large subset of them) in each row respectively, an identical offset term (or set of terms) may be applied. This may inhibit the filter from blurring spatially local details.

In one example, an estimate of the column offset terms may be calculated using only a subset of the rows (e.g., the first 32 rows). In this case, only a 32 row delay is needed to apply the column correction terms in the current frame. This may improve filter performance in removing high temporal frequency column noise. Alternatively, the filter may be designed with minimum delay, and the correction terms are only applied once a reasonable estimate can be calculated (e.g., using data from the 32 rows). In this case, only rows 33 and beyond may be optimally filtered.

In one aspect, all samples may not be needed, and in such an instance, only every 2nd or 4th row, e.g., may be used for calculating the column noise. In another aspect, the same may apply when calculating row noise, and in such an instance, only data from every 4th column, e.g., may be used. It should be appreciated that various other iterations may be used by one skilled in the art without departing from the scope of the invention.

In one aspect, the filter may operate in recursive mode in which the filtered data is filtered instead of the raw data being filtered. In another aspect, the mean difference between a pixel in one row and pixels in neighboring rows may be approximated in an efficient way if a recursive (IIR) filter is used to calculate an estimated running mean. For example, instead of taking the mean of neighbor differences (e.g., eight neighbor differences), the difference between a pixel and the mean of the neighbors may be calculated.

Figure 15B:
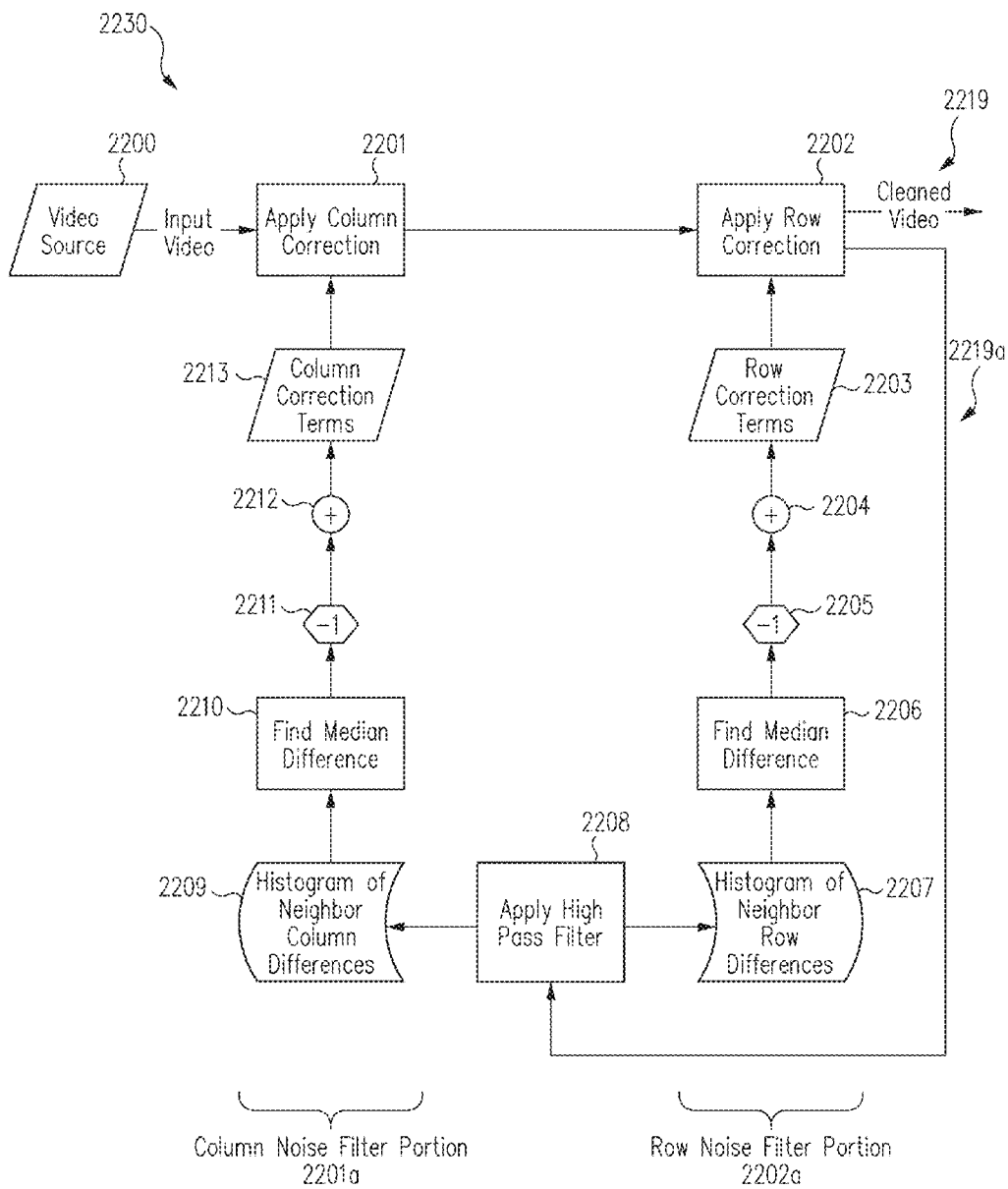

In accordance with an embodiment of the disclosure, FIG. 15B shows an alternative method 2230 for noise filtering infrared image data. In reference to FIGS. 15A and 15B, one or more of the process steps and/or operations of method 2220 of FIG. 15A have changed order or have been altered or combined for the method 2230 of FIG. 15B. For example, the operation of calculating row and column neighbor differences (blocks 2214, 2215) may be removed or combined with other operations, such as generating histograms of row and column neighbor differences (blocks 2207, 2209). In another example, the delay operation (block 2205) may be performed after finding the median difference (block 2206). In various examples, it should be appreciated that similar process steps and/or operations have similar scope, as previously described in FIG. 15A, and therefore, the description will not be repeated.

In still other alternate approaches to methods 2220 and 2230, embodiments may exclude the histograms and rely on mean calculated differences instead of median calculated differences. In one aspect, this may be slightly less robust but may allow for a simpler implementation of the column and row noise filters. For example, the mean of neighboring rows and columns, respectively, may be approximated by a running mean implemented as an infinite impulse response (IIR) filter.

In the row noise case, the IIR filter implementation may reduce or even eliminate the need to buffer several rows of data for mean calculations.

In still other alternate approaches to methods 2220 and 2230, new noise estimates may be calculated in each frame of the video data and only applied in the next frame (e.g., after noise estimates). In one aspect, this alternate approach may provide less performance but may be easier to implement. In another aspect, this alternate approach may be referred to as a non-recursive method, as understood by those skilled in the art.

Figure 15C:
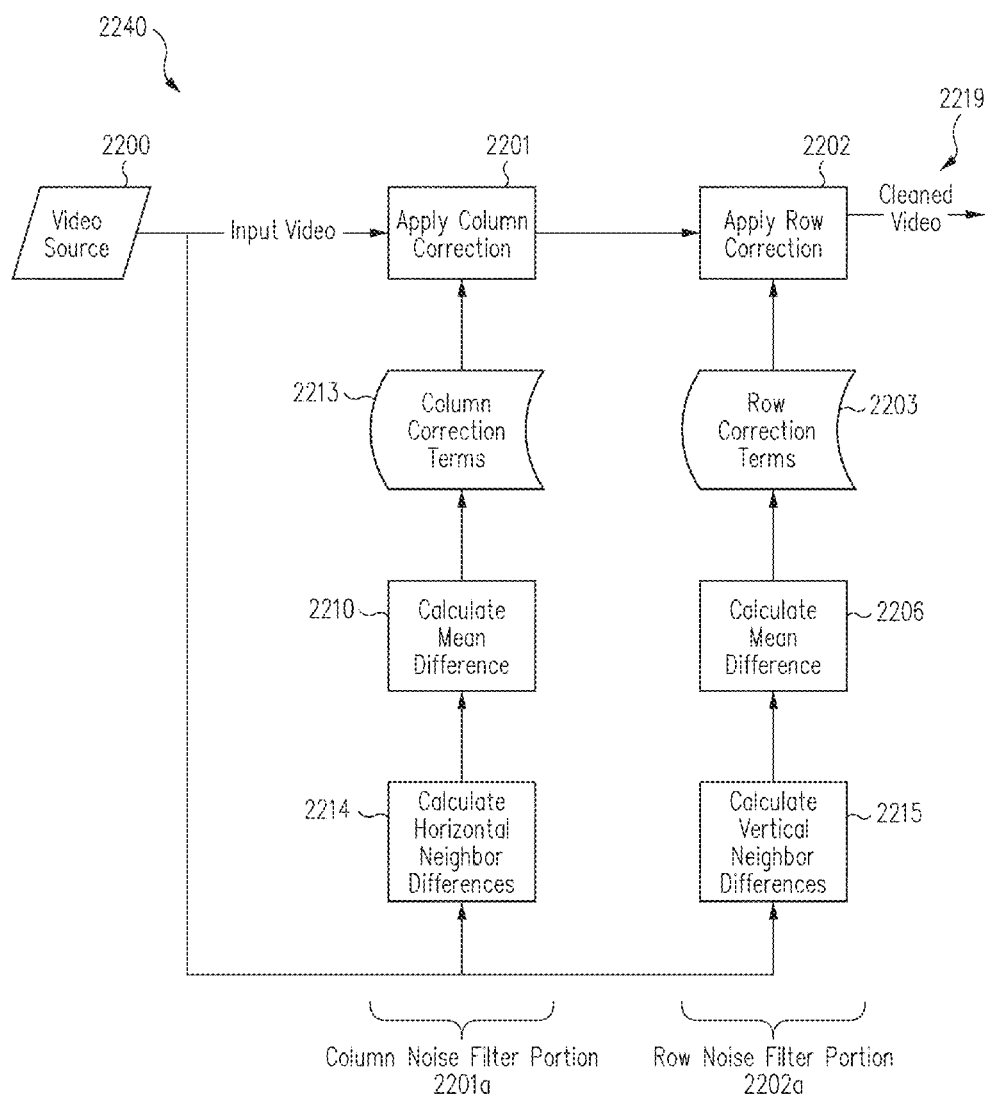

For example, in one embodiment, the method 2240 of FIG. 15C comprises a high level block diagram of row and column noise filtering algorithms. In one aspect, the row and column noise filter algorithms may be optimized to use minimal hardware resources. In reference to FIGS. 15A and 15B, similar process steps and/or operations may have similar scope, and therefore, the descriptions will not be repeated.

Referring to FIG. 15C, the process flow of the method 2240 implements a non-recursive mode of operation. As shown, the method 2240 applies column offset correction term 2201 and row offset correction term 2202 to the uncorrected input video data from video source 2200 to produce, e.g., a corrected or cleaned output video signal 2219. In column noise filter portion 2201a, column offset correction terms 2213 are calculated based on the mean difference 2210 between pixel values in a specific column and one or more pixels belonging to neighboring columns 2214. In row noise filter portion 2202a, row offset correction terms 2203 are calculated based on the mean difference 2206 between pixel values in a specific row and one or more pixels belonging to neighboring rows 2215. In one aspect, the order (e.g., rows first or columns first) in which row or column offset correction terms 2203, 2213 are applied to the input video data from video source 2200 may be considered arbitrary. In another aspect, the row and column correction terms may not be fully known until the end of the video frame, and therefore, if the input video data from the video source 2200 is not delayed, the row and column correction terms 2203, 2213 may not be applied to the input video data from which they were calculated.

In one aspect of the invention, the column and row noise filter algorithm may operate continuously on image data provided by an infrared imaging sensor (e.g., image capture component 2130 of FIG. 14). Unlike conventional methods that may require a uniform scene (e.g., as provided by a shutter or external calibrated black body) to estimate the spatial noise, the column and row noise filter algorithms, as set forth in one or more embodiments, may operate on real-time scene data. In one aspect, an assumption may be made that, for some small neighborhood around location [x, y], neighboring infrared sensor elements should provide similar values since they are imaging parts of the scene in close proximity. If the infrared sensor reading from a particular infrared sensor element differs from a neighbor, then this could be the result of spatial noise. However, in some instances, this may not be true for each and every sensor element in a particular row or column (e.g., due to local gradients that are a natural part of the scene), but on average, a row or column may have values that are close to the values of the neighboring rows and columns.

For one or more embodiments, by first taking out one or more low spatial frequencies (e.g., using a high pass filter (HPF)), the scene contribution may be minimized to leave differences that correlate highly with actual row and column spatial noise. In one aspect, by using an edge preserving filter, such as a Median filter or a Bilateral filter, one or more embodiments may minimize artifacts due to strong edges in the image.

Figure 16A:
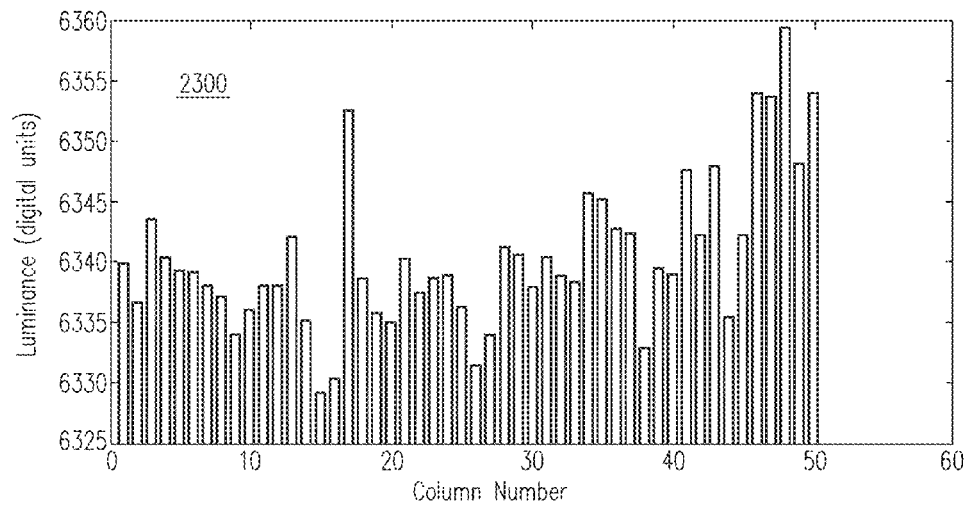
FIGS. 16A-C are graphs illustrating infrared image data and the processing of an infrared image in accordance with embodiments of the disclosure.
Figure 16B:
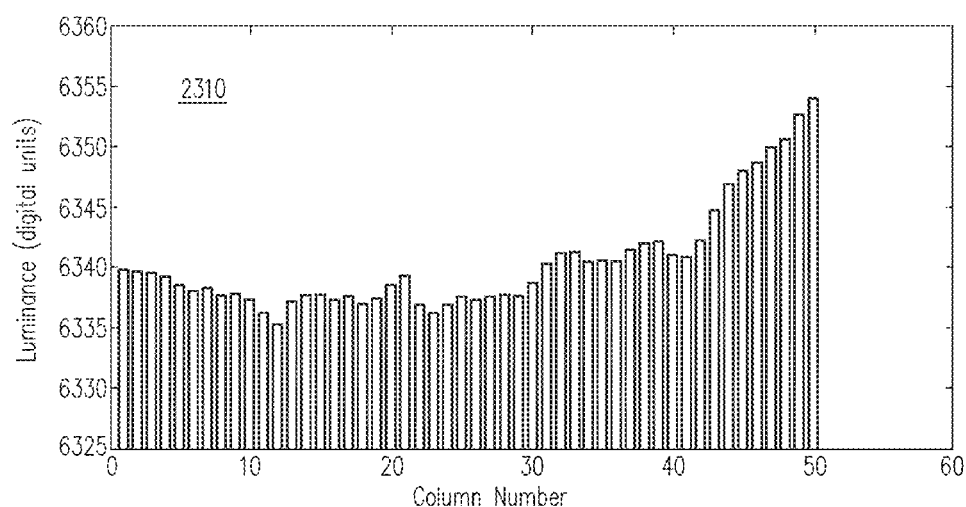
Figure 16C:
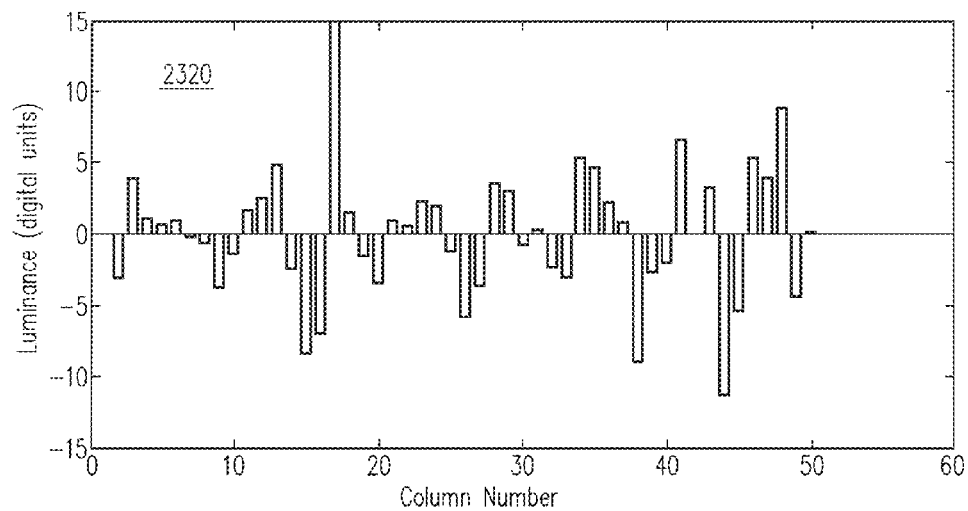

In accordance with one or more embodiments of the disclosure, FIGS. 16A to 16C show a graphical implementation (e.g., digital counts versus data columns) of filtering an infrared image. FIG. 16A shows a graphical illustration (e.g., graph 2300) of typical values, as an example, from a row of sensor elements when imaging a scene. FIG. 16B shows a graphical illustration (e.g., graph 2310) of a result of a low pass filtering (LPF) of the image data values from FIG. 16A. FIG. 16C shows a graphical illustration (e.g., graph 2320) of subtracting the low pass filter (LPF) output in FIG. 16B from the original image data in FIG. 16A, which results in a high pass filter (HPF) profile with low and mid frequency components removed from the scene of the original image data in FIG. 16A. Thus, FIG. 16A-16C illustrate a HPF technique, which may be used for one or more embodiments (e.g., as with methods 2220 and/or 2230).

In one aspect of the invention, a final estimate of column and/or row noise may be referred to as an average or median estimate of all of the measured differences. Because noise characteristics of an infrared sensor are often generally known, then one or more thresholds may be applied to the noise estimates. For example, if a difference of 60 digital counts is measured, but it is known that the noise typically is less than 10 digital counts, then this measurement may be ignored.

Figure 17:
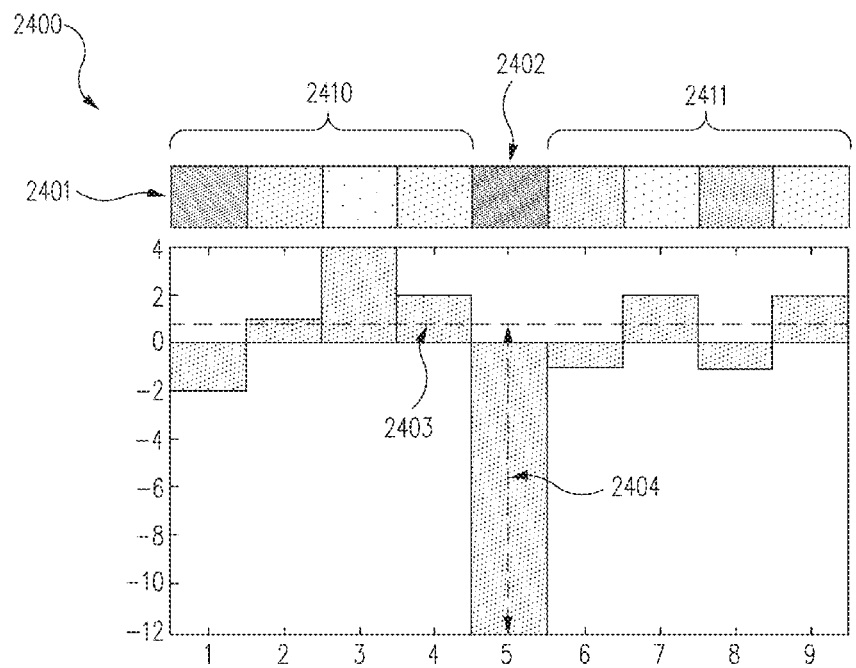
FIG. 17 shows a portion of a row of sensor data for discussing processing techniques in accordance with embodiments of the disclosure.

In accordance with one or more embodiments of the disclosure, FIG. 17 shows a graphical illustration 2400 (e.g., digital counts versus data columns) of a row of sensor data 2401 (e.g., a row of pixel data for a plurality of pixels in a row) with column 5 data 2402 and data for eight nearest neighbors (e.g., nearest pixel neighbors, 4 columns 2410 to the left of column 5 data 2402 and 4 columns 2411 to the right of column 5 data 2402). In one aspect, referring to FIG. 17, the row of sensor data 2401 is part of a row of sensor data for an image or scene captured by a multi-pixel infrared sensor or detector (e.g., image capture component 2130 of FIG. 14). In one aspect, column 5 data 2402 is a column of data to be corrected. For this row of sensor data 2401, the difference between column 5 data 2402 and a mean 2403 of its neighbor columns (2410, 2411) is indicated by an arrow 2404. Therefore, noise estimates may be obtained and accounted for based on neighboring data.

Figure 18A:
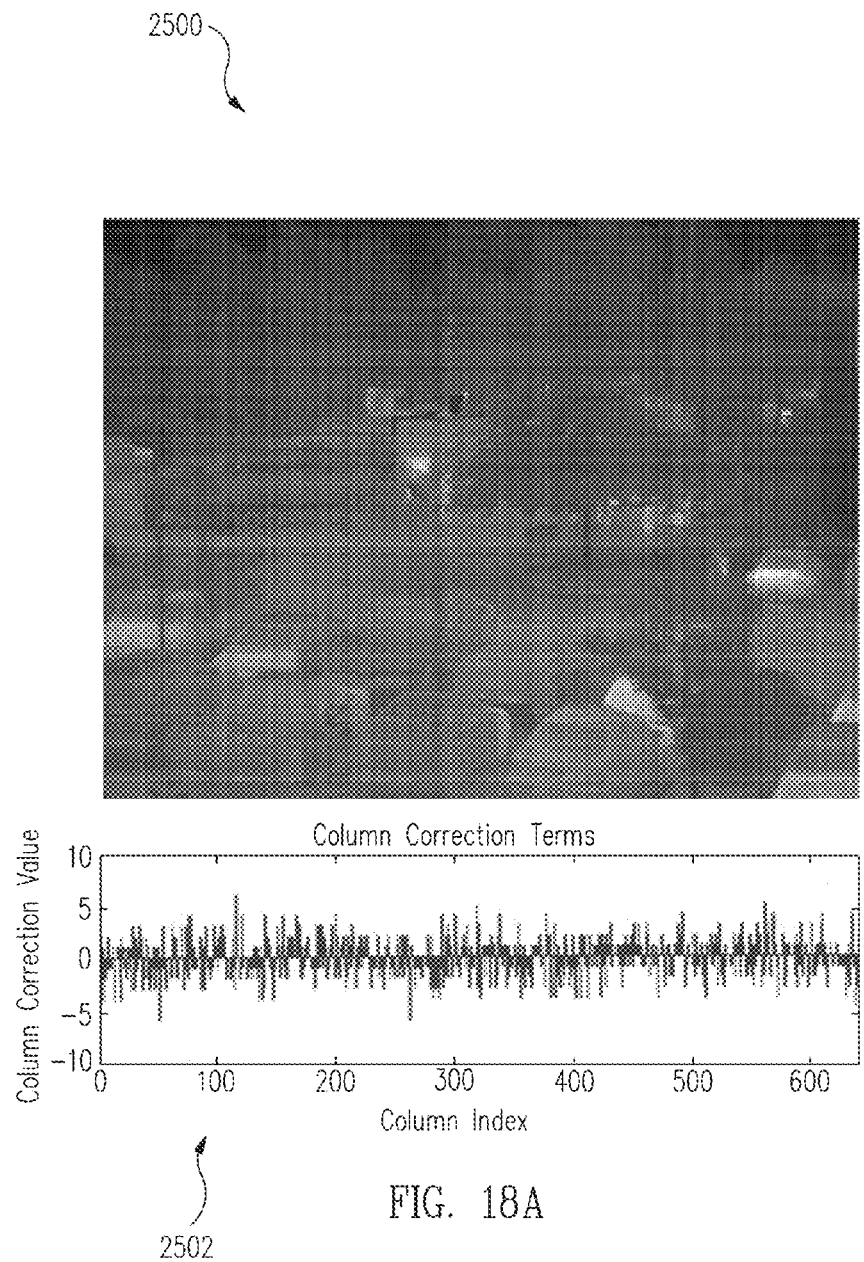
FIGS. 18A-C show an exemplary implementation of column and row noise filtering for an infrared image in accordance with embodiments of the disclosure.
Figure 18B:
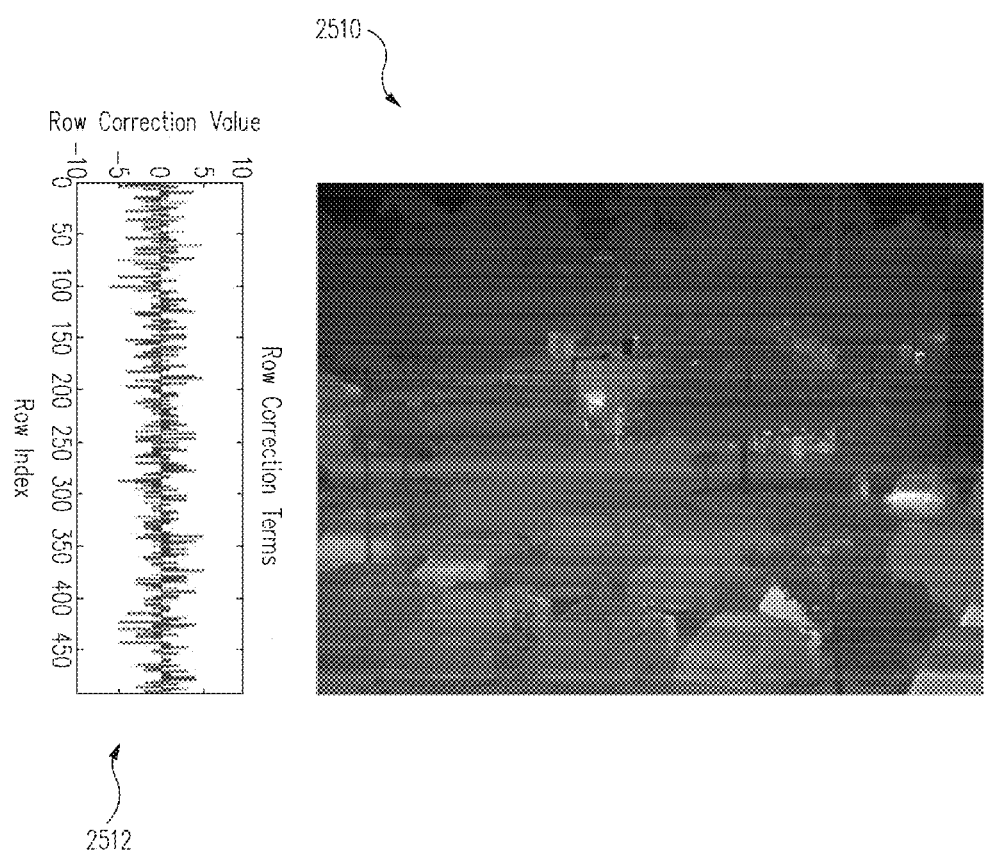
Figure 18C:

In accordance with one or more embodiments of the disclosure, FIGS. 18A to 18C show an exemplary implementation of column and row noise filtering an infrared image (e.g., an image frame from infrared video data). FIG. 18A shows an infrared image 2500 with column noise estimated from a scene with severe row and column noise present and a corresponding graph 2502 of column correction terms. FIG. 18B shows an infrared image 2510, with column noise removed and spatial row noise still present, with row correction terms estimated from the scene in FIG. 18A and a corresponding graph 2512 of row correction terms. FIG. 18C shows an infrared image 2520 of the scene in FIG. 18A as a cleaned infrared image with row and column noise removed (e.g., column and row correction terms of FIGS. 18A-18B applied).

In one embodiment, FIG. 18A shows an infrared video frame (i.e., infrared image 2500) with severe row and column noise. Column noise correction coefficients are calculated as described herein to produce, e.g., 639 correction terms, i.e., one correction term per column. The graph 2502 shows the column correction terms. These offset correction terms are subtracted from the infrared video frame 2500 of FIG. 18A to produce the infrared image 2510 in FIG. 18B. As shown in FIG. 18B, the row noise is still present. Row noise correction coefficients are calculated as described herein to produce, e.g., 639 row terms, i.e., one correction term per row. The graph 2512 shows the row offset correction terms, which are subtracted from the infrared image 2510 in FIG. 18B to produce the cleaned infrared image 2520 in FIG. 18C with significantly reduced or removed row and column noise.

In various embodiments, it should be understood that both row and column filtering is not required. For example, either column noise filtering 2201a or row noise filtering 2202a may be performed in methods 2220, 2230 or 2240.

It should be appreciated that any reference to a column or a row may include a partial column or a partial row and that the terms "row" and "column" are interchangeable and not limiting. For example, without departing from the scope of the invention, the term "row" may be used to describe a row or a column, and likewise, the term "column" may be used to describe a row or a column, depending upon the application.

In various aspects, column and row noise may be estimated by looking at a real scene (e.g., not a shutter or a black body), in accordance with embodiments of the noise filtering algorithms, as disclosed herein. The column and row noise may be estimated by measuring the median or mean difference between sensor readings from elements in a specific row (and/or column) and sensor readings from adjacent rows (and/or columns).

Optionally, a high pass filter may be applied to the image data prior to measuring the differences, which may reduce or at least minimize a risk of distorting gradients that are part of the scene and/or introducing artifacts. In one aspect, only sensor readings that differ by less than a configurable threshold may be used in the mean or median estimation. Optionally, a histogram may be used to effectively estimate the median. Optionally, only histogram bins exceeding a minimum count may be used when finding the median estimate from the histogram. Optionally, a recursive IIR filter may be used to estimate the difference between a pixel and its neighbors, which may reduce or at least minimize the need to store image data for processing, e.g., the row noise portion (e.g., if image data is read out row wise from the sensor). In one implementation, the current mean column value $\overline{C}_{i,j}$ for column i at row j may be estimated using the following recursive filter algorithm.

$$\overline{C}_{i,j} = (1-\alpha) \cdot \overline{C}_{i-1,j} + \alpha \cdot C_{i,j}$$

$$\Delta R_i = \frac{1}{N} \sum_{j=1}^{N} C_{i,j} - \overline{C}_{i-1,j}$$

In this equation $\alpha$ is the damping factor and may be set to for example 0.2 in which case the estimate for the running mean of a specific column i at row j will be a weighted sum of the estimated running mean for column i−1 at row j and the current pixel value at row j and column i. The estimated difference between values of row j and the values of neighboring rows can now be approximated by taking the difference of each value $C_{i,j}$ and the running recursive mean of the neighbors above row i ($\overline{C}_{i-1,j}$). Estimating the mean difference this way is not as accurate as taking the true mean difference since only rows above are used but it requires that only one row of running means are stored as compared to several rows of actual pixel values be stored.

In one embodiment, referring to FIG. 15A, the process flow of method 2220 may implement a recursive mode of operation, wherein the previous column and row correction terms are applied before calculating row and column noise, which allows for correction of lower spatial frequencies when the image is high pass filtered prior to estimating the noise.

Generally, during processing, a recursive filter re-uses at least a portion of the output data as input data. The feedback input of the recursive filter may be referred to as an infinite impulse response (IIR), which may be characterized, e.g., by exponentially growing output data, exponentially decaying output data, or sinusoidal output data. In some implementations, a recursive filter may not have an infinite impulse response. As such, e.g., some implementations of a moving average filter function as recursive filters but with a finite impulse response (FIR).

As further set forth in the description of FIGS. 19A to 22B, additional techniques are contemplated to determine row and/or column correction terms. For example, in some embodiments, such techniques may be used to provide correction terms without overcompensating for the presence of vertical and/or horizontal objects present in scene 2170. Such techniques may be used in any appropriate environment where such objects may be frequently captured including, for example, urban applications, rural applications, vehicle applications, and others. In some embodiments, such techniques may provide correction terms with reduced memory and/or reduced processing overhead in comparison with other approaches used to determine correction terms.

Figure 19A:
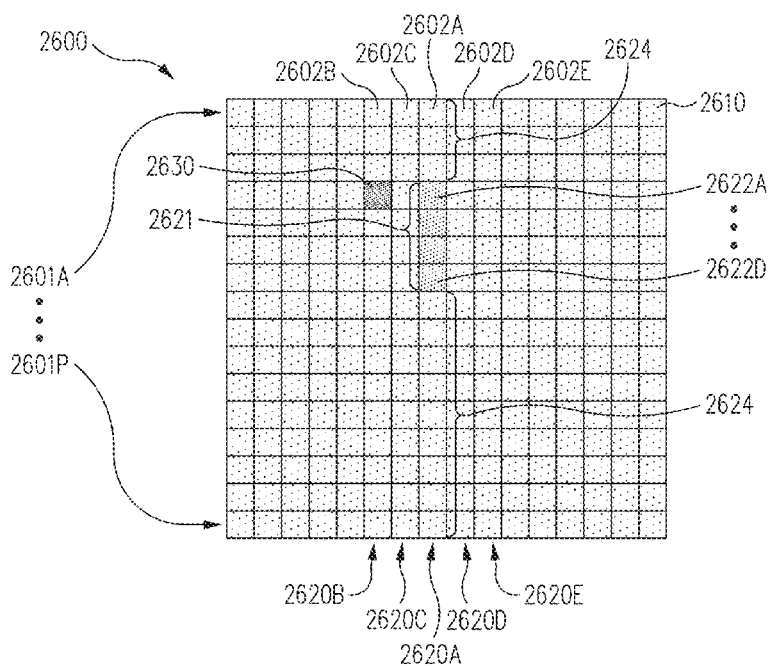
FIG. 19A shows an infrared image of a scene including small vertical structure in accordance with an embodiment of the disclosure.

FIG. 19A shows an infrared image 2600 (e.g., infrared image data) of scene 2170 in accordance with an embodiment of the disclosure. Although infrared image 2600 is depicted as having 16 rows and 16 columns, other image sizes are contemplated for infrared image 2600 and the various other infrared images discussed herein. For example, in one embodiment, infrared image 2600 may have 640 columns and 512 rows.

In FIG. 19A, infrared image 2600 depicts scene 2170 as relatively uniform, with a majority of pixels 2610 of infrared image 2600 having the same or similar intensity (e.g., the same or similar numbers of digital counts). Also in this embodiment, scene 2170 includes an object 2621 which appears in pixels 2622A-D of a column 2620A of infrared image 2600. In this regard, pixels 2622A-D are depicted somewhat darker than other pixels 2610 of infrared image 2600. For purposes of discussion, it will be assumed that darker pixels are associated with higher numbers of digital counts, however lighter pixels may be associated with higher numbers of digital counts in other implementations if desired. As shown, the remaining pixels 2624 of column 2620A have a substantially uniform intensity with pixels 2610.

In some embodiments, object 2621 may be a vertical object such as a building, telephone pole, light pole, power line, cellular tower, tree, human being, and/or other object. If image capture component 2130 is disposed in a vehicle approaching object 2621, then object 2621 may appear relatively fixed in infrared image 2600 while the vehicle is still sufficiently far away from object 2621 (e.g., object 2621 may remain primarily represented by pixels 2622A-D and may not significantly shift position within infrared image 2600). If image capture component 2130 is disposed at a fixed location relative to object 2621, then object 2621 may also appear relatively fixed in infrared image 2600 (e.g., if object 2621 is fixed and/or is positioned sufficiently far away). Other dispositions of image capture component 2130 relative to object 2621 are also contemplated.

Infrared image 2600 also includes another pixel 2630 which may be attributable to, for example, temporal noise, fixed spatial noise, a faulty sensor/circuitry, actual scene information, and/or other sources. As shown in FIG. 19A, pixel 2630 is darker (e.g., has a higher number of digital counts) than all of pixels 2610 and 2622A-D.

Vertical objects such as object 2621 depicted by pixels 2622A-D are often problematic for some column correction techniques. In this regard, objects that remain disposed primarily in one or several columns may result in overcompensation when column correction terms are calculated without regard to the possible presence of small vertical objects appearing in scene 2170. For example, when pixels 2622A-D of column 2620A are compared with those of nearby columns 2620B-E, some column correction techniques may interpret pixels 2622A-D as column noise, rather than actual scene information. Indeed, the significantly darker appearance of pixels 2622A-D relative to pixels 2610 and the relatively small width of object 2621 disposed in column 2620A may skew the calculation of a column correction term to significantly correct the entire column 2620A, although only a small portion of column 2620A actually includes darker scene information. As a result, the column correction term determined for column 2620A may significantly lighten (e.g., brighten or reduce the number of digital counts) column 2620A to compensate for the assumed column noise.

Figure 19B:
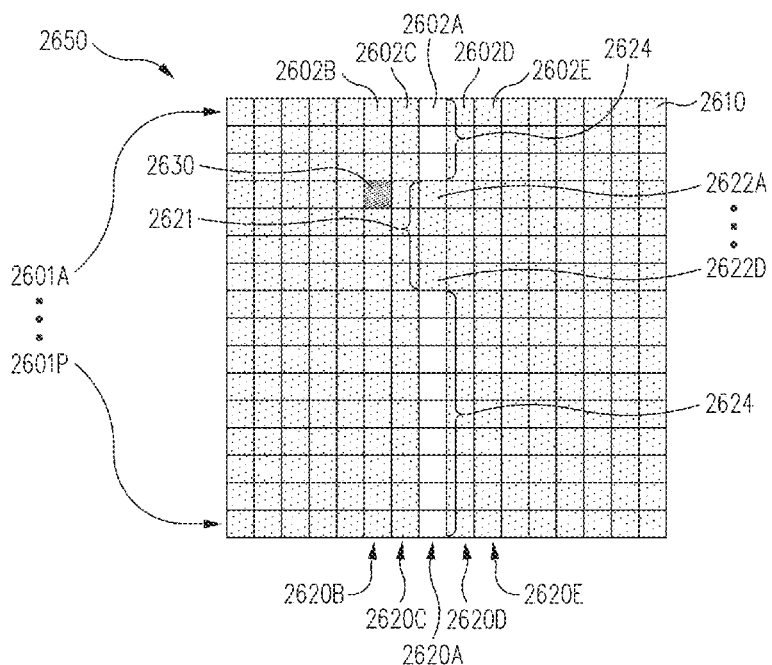
FIG. 19B shows a corrected version of the infrared image of FIG. 19A in accordance with an embodiment of the disclosure.

For example, FIG. 19B shows a corrected version 2650 of infrared image 2600 of FIG. 19A. As shown in FIG. 19B, column 2620A has been significantly brightened. Pixels 2622A-D have been made significantly lighter to be approximately uniform with pixels 2610, and the actual scene information (e.g., the depiction of object 2621) contained in pixels 2622A-D has been mostly lost. In addition, remaining pixels 2624 of column 2620A have been significantly brightened such that they are no longer substantially uniform with pixels 2610. Indeed, the column correction term applied to column 2620A has actually introduced new non-uniformities in pixels 2624 relative to the rest of scene 2170.

Various techniques described herein may be used to determine column correction terms without overcompensating for the appearance of various vertical objects that may be present in scene 2170. For example, in one embodiment, when such techniques are applied to column 2620A of FIG. 19A, the presence of dark pixels 2622A-D may not cause any further changes to the column correction term for column 2620A (e.g., after correction is applied, column 2620A may appear as shown in FIG. 19A rather than as shown in FIG. 19B).

In accordance with various embodiments further described herein, corresponding column correction terms may be determined for each column of an infrared image without overcompensating for the presence of vertical objects present in scene 2170. In this regard, a first pixel of a selected column of an infrared image (e.g., the pixel of the column residing in a particular row) may be compared with a corresponding set of other pixels (e.g., also referred to as neighborhood pixels) that are within a neighborhood associated with the first pixel. In some embodiments, the neighborhood may correspond to pixels in the same row as the first pixel that are within a range of columns. For example, the neighborhood may be defined by an intersection of: the same row as the first pixel; and a predetermined range of columns.

The range of columns may be any desired number of columns on the left side, right side, or both left and right sides of the selected column. In this regard, if the range of columns corresponds to two columns on both sides of the selected column, then four comparisons may be made for the first pixel (e.g., two columns to the left of the selected column, and two columns to the right of the selected column). Although a range of two columns on both sides of the selected column is further described herein, other ranges are also contemplated (e.g., 5 columns, 8 columns, or any desired number of columns).

One or more counters (e.g., registers, memory locations, accumulators, and/or other implementations in processing component 2110, noise filtering module 2112, memory component 2120, and/or other components) are adjusted (e.g., incremented, decremented, or otherwise updated) based on the comparisons. In this regard, for each comparison where the pixel of the selected column has a lesser value than a compared pixel, a counter A may be adjusted. For each comparison where the pixel of the selected column has an equal (e.g., exactly equal or substantially equal) value as a compared pixel, a counter B may be adjusted. For each comparison where the pixel of the selected column has a greater value than a compared pixel, a counter C may be adjusted. Thus, if the range of columns corresponds to two columns on either side of the selected column as identified in the example above, then a total of four adjustments (e.g., counts) may be collectively held by counters A, B, and C.

After the first pixel of the selected column is compared with all pixels in its corresponding neighborhood, the process is repeated for all remaining pixels in the selected column (e.g., one pixel for each row of the infrared image), and counters A, B, and C continue to be adjusted in response to the comparisons performed for the remaining pixels. In this regard, in some embodiments, each pixel of the selected column may be compared with a different corresponding neighborhood of pixels (e.g., pixels residing: in the same row as the pixel of the selected column; and within a range of columns), and counters A, B, and C may be adjusted based on the results of such comparisons.

As a result, after all pixels of the selected column are compared, counters A, B, and C may identify the number of comparisons for which pixels of the selected column were found to be greater, equal, or less than neighborhood pixels. Thus, continuing the example above, if the infrared image has 16 rows, then a total of 64 counts may be distributed across counters A, B, and C for the selected column (e.g., 4 counts per row×16 rows=64 counts). It is contemplated that other numbers of counts may be used. For example, in a large array having 512 rows and using a range of 10 columns, 5120 counts (e.g., 512 rows×10 columns) may be used to determine each column correction term.

Based on the distribution of the counts in counters A, B, and C, the column correction term for the selected column may be selectively incremented, decremented, or remain the same based on one or more calculations performed using values of one or more of counters A, B, and/or C. For example, in some embodiments: the column correction term may be incremented if counter A−counter B−counter C>D; the column correction term may be decremented if counter C−counter A−counter B>D; and the column correction term may remain the same in all other cases. In such embodiments, D may be a value such as a constant value smaller than the total number of comparisons accumulated by counters A, B, and C per column. For example, in one embodiment, D may have a value equal to: (number of rows)/2.

The process may be repeated for all remaining columns of the infrared image in order to determine (e.g., calculate and/or update) a corresponding column correction term for each column of the infrared image. In addition, after column correction terms have been determined for one or more columns, the process may be repeated for one or more columns (e.g., to increment, decrement, or not change one or more column correction terms) after the column corrected terms are applied to the same infrared image and/or another infrared image (e.g., a subsequently captured infrared image).

As discussed, counters A, B, and C identify the number of compared pixels that are less than, equal to, or greater than pixels of the selected column. This contrasts with various other techniques used to determine column correction terms where the actual differences (e.g., calculated difference values) between compared pixels may be used.

Figure 20A:
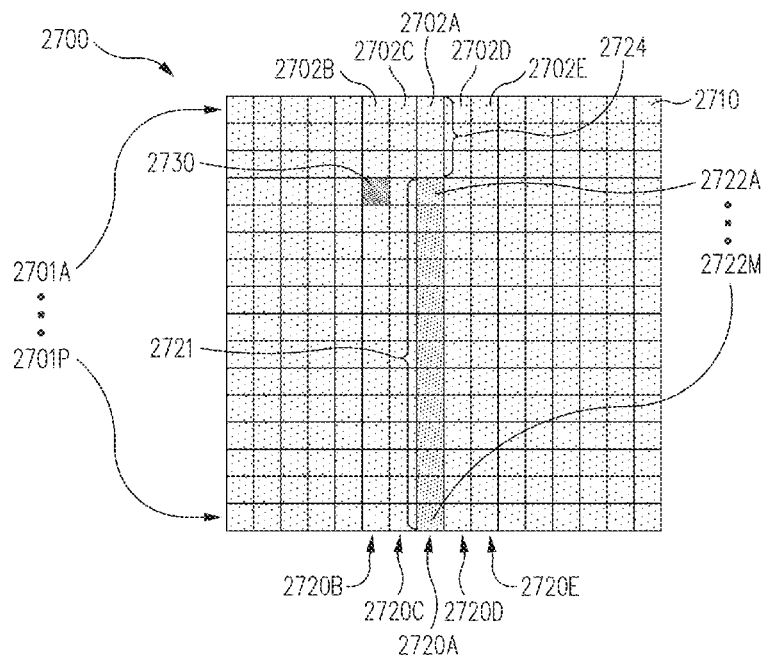
FIG. 20A shows an infrared image of a scene including a large vertical structure in accordance with an embodiment of the disclosure.
Figure 20B:
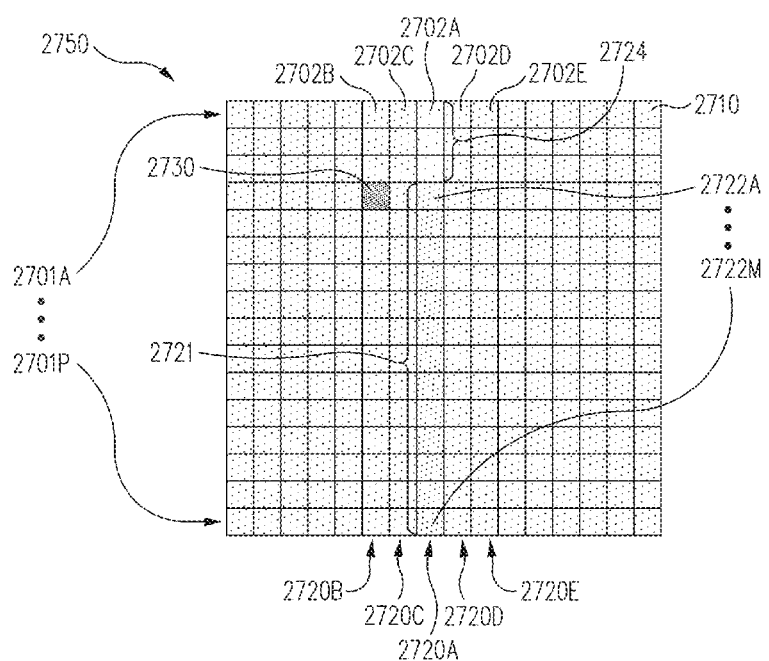
FIG. 20B shows a corrected version of the infrared image of FIG. 20A in accordance with an embodiment of the disclosure.

By determining column correction terms based on less than, equal to, or greater than relationships (e.g., rather than the actual numerical differences between the digital counts of different pixels), the column correction terms may be less skewed by the presence of small vertical objects appearing in infrared images. In this regard, by using this approach, small objects such as object 2621 with high numbers of digital counts may not inadvertently cause column correction terms to be calculated that would overcompensate for such objects (e.g., resulting in an undesirable infrared image 2650 as shown in FIG. 19B). Rather, using this approach, object 2621 may not cause any change to column correction terms (e.g., resulting in an unchanged infrared image 2600 as shown in FIG. 19A). However, larger objects such as object 2721 which may be legitimately identified as column noise may be appropriately reduced through adjustment of column correction terms (e.g., resulting in a corrected infrared image 2750 as shown in FIG. 20B).

In addition, using this approach may reduce the effects of other types of scene information on column correction term values. In this regard, counters A, B, and C identify relative relationships (e.g., less than, equal to, or greater than relationships) between pixels of the selected column and neighborhood pixels. In some embodiments, such relative relationships may correspond, for example, to the sign (e.g., positive, negative, or zero) of the difference between the values of pixels of the selected column and the values of neighborhood pixels. By using relative relationships rather than actual numerical differences, exponential scene changes (e.g., nonlinear scene information gradients) may contribute less to column correction term determinations. For example, exponentially higher digital counts in certain pixels may be treated as simply being greater than or less than other pixels for comparison purposes and consequently will not unduly skew the column correction term.

In addition, by identifying relative relationships rather than actual numerical differences in counters A, B, and C, high pass filtering can be reduced in some embodiments. In this regard, where low frequency scene information or noise remains fairly uniform throughout compared neighborhoods of pixels, such low frequency content may not significantly affect the relative relationships between the compared pixels.

Advantageously, counters A, B, and C provide an efficient approach to calculating column correction terms. In this regard, in some embodiments, only three counters A, B, and C are used to store the results of all pixel comparisons performed for a selected column. This contrasts with various other approaches in which many more unique values are stored (e.g., where particular numerical differences, or the number of occurrences of such numerical differences, are stored).

In some embodiments, where the total number of rows of an infrared image is known, further efficiency may be achieved by omitting counter B. In this regard, the total number of counts may be known based on the range of columns used for comparison and the number of rows of the infrared image. In addition, it may be assumed that any comparisons that do not result in counter A or counter C being adjusted will correspond to those comparisons where pixels have equal values. Therefore, the value that would have been held by counter B may be determined from counters A and C (e.g., (number of rows×range)−counter A value−counter B value=counter C value).

In some embodiments, only a single counter may be used. In this regard, a single counter may be selectively adjusted in a first manner (e.g., incremented or decremented) for each comparison where the pixel of the selected column has a greater value than a compared pixel, selectively adjusted in a second manner (e.g., decremented or incremented) for each comparison where the pixel of the selected column has a lesser value than a compared pixel, and not adjusted (e.g., retaining its existing value) for each comparison where the pixel of the selected column has an equal (e.g., exactly equal or substantially equal) value as a compared pixel. Thus, the value of the single counter may indicate relative numbers of compared pixels that are greater than or less than the pixels of the selected column (e.g., after all pixels of the selected column have been compared with corresponding neighborhood pixels).

A column correction term for the selected column may be updated (e.g., incremented, decremented, or remain the same) based on the value of the single counter. For example, in some embodiments, if the single counter exhibits a baseline value (e.g., zero or other number) after comparisons are performed, then the column correction term may remain the same. In some embodiments, if the single counter is greater or less than the baseline value, the column correction term may be selectively incremented or decremented as appropriate to reduce the overall differences between the compared pixels and the pixels of the selected column. In some embodiments, the updating of the column correction term may be conditioned on the single counter having a value that differs from the baseline value by at least a threshold amount to prevent undue skewing of the column correction term based on limited numbers of compared pixels having different values from the pixels of the selected column.

These techniques may also be used to compensate for larger vertical anomalies in infrared images where appropriate. For example, FIG. 20A illustrates an infrared image 2700 of scene 2170 in accordance with an embodiment of the disclosure. Similar to infrared image 2600, infrared image 2700 depicts scene 2170 as relatively uniform, with a majority of pixels 2710 of infrared image 2700 having the same or similar intensity. Also in this embodiment, a column 2720A of infrared image 2700 includes pixels 2722A-M that are somewhat darker than pixels 2710, while the remaining pixels 2724 of column 2720A have a substantially uniform intensity with pixels 2710.

However, in contrast to pixels 2622A-D of FIG. 19A, pixels 2722A-M of FIG. 20A occupy a significant majority of column 2720A. As such, it is more likely that an object 2721 depicted by pixels 2722A-M may actually be an anomaly such as column noise or another undesired source rather than an actual structure or other actual scene information. For example, in some embodiments, it is contemplated that actual scene information that occupies a significant majority of at least one column would also likely occupy a significant horizontal portion of one or more rows. For example, a vertical structure in close proximity to image capture component 2130 may be expected to occupy multiple columns and/or rows of infrared image 2700. Because object 2721 appears as a tall narrow band occupying a significant majority of only one column 2720A, it is more likely that object 2721 is actually column noise.

FIG. 20B shows a corrected version 2750 of infrared image 2700 of FIG. 20A. As shown in FIG. 20B, column 2720A has been brightened, but not as significantly as column 2620A of infrared image 2650. Pixels 2722A-M have been made lighter, but still appear slightly darker than pixels 2710. In another embodiment, column 2720A may be corrected such that pixels 2722A-M may be approximately uniform with pixels 2710. As also shown in FIG. 20B, remaining pixels 2724 of column 2720A have been brightened but not as significantly as pixels 2624 of infrared image 2650. In another embodiment, pixels 2724 may be further brightened or may remain substantially uniform with pixels 2710.

Figure 21:
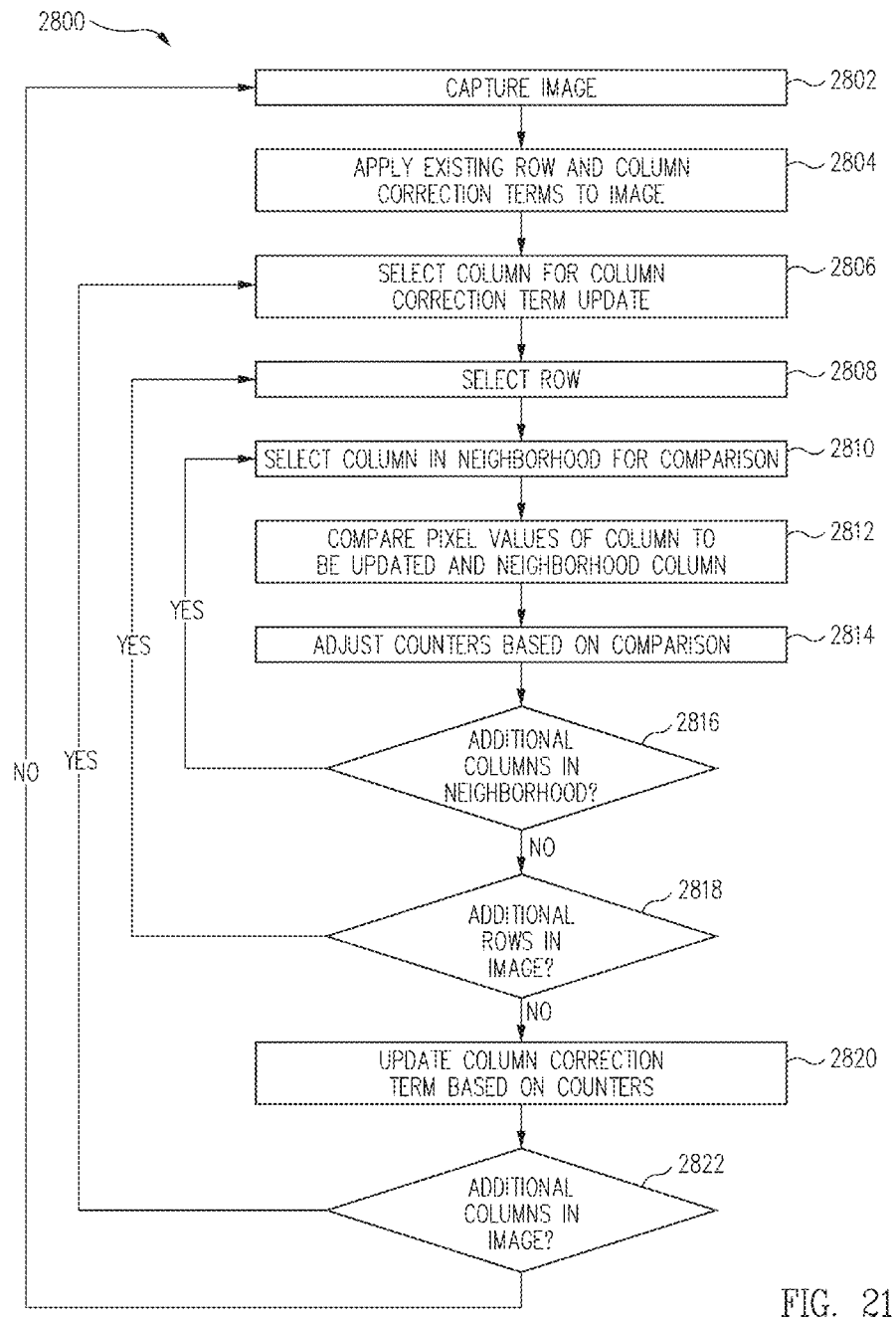
FIG. 21 is a flowchart illustrating another method for noise filtering an infrared image in accordance with an embodiment of the disclosure.
Figure 22A:
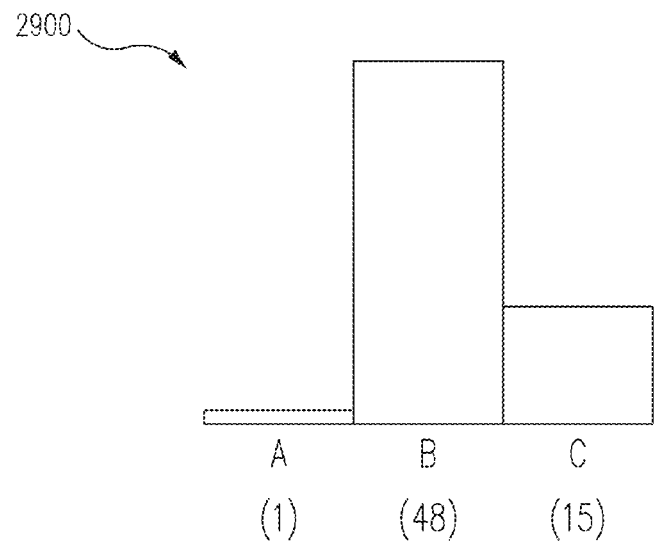
FIG. 22A shows a histogram prepared for the infrared image of FIG. 19A in accordance with an embodiment of the disclosure.
Figure 22B:
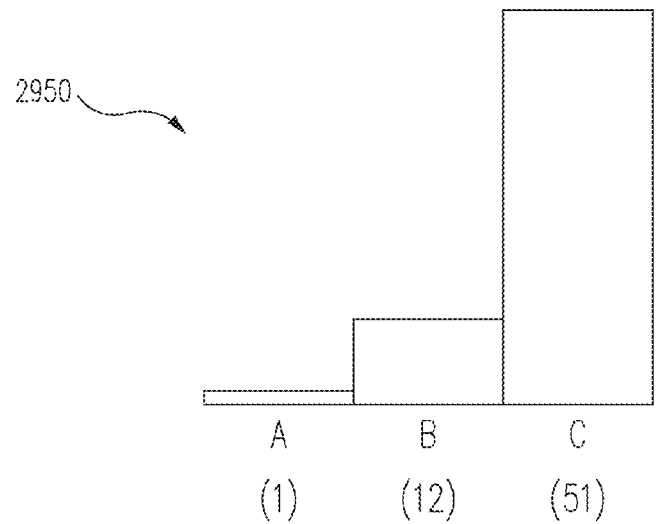
FIG. 22B shows a histogram prepared for the infrared image of FIG. 20A in accordance with an embodiment of the disclosure.

Various aspects of these techniques are further explained with regard to FIGS. 21 and 22A-B. In this regard, FIG. 21 is a flowchart illustrating a method 2800 for noise filtering an infrared image, in accordance with an embodiment of the disclosure. Although particular components of system 2100 are referenced in relation to particular blocks of FIG. 21, the various operations described with regard to FIG. 21 may be performed by any appropriate components, such as image capture component 2130, processing component, 2110, noise filtering module 2112, memory component 2120, control component 2140, and/or others.

In block 2802, image capture component 2130 captures an infrared image (e.g., infrared image 2600 or 2700) of scene 2170. In block 2804, noise filtering module 2112 applies existing row and column correction terms to infrared image 2600/2700. In some embodiments, such existing row and column correction terms may be determined by any of the various techniques described herein, factory calibration operations, and/or other appropriate techniques. In some embodiments, the column correction terms applied in block 2804 may be undetermined (e.g., zero) during a first iteration of block 2804, and may be determined and updated during one or more iterations of FIG. 21.

In block 2806, noise filtering module 2112 selects a column of infrared image 2600/2700. Although column 2620A/2720A will be referenced in the following description, any desired column may be used. For example, in some embodiments, a rightmost or leftmost column of infrared image 2600/2700 may be selected in a first iteration of block 2806. In some embodiments, block 2806 may also include resetting counters A, B, and C to zero or another appropriate default value.

In block 2808, noise filtering module 2112 selects a row of infrared image 2600/2700, For example, a topmost row 2601A/2701A of infrared image 2600/2700 may be selected in a first iteration of block 2808. Other rows may be selected in other embodiments.

In block 2810, noise filtering module 2112 selects another column in a neighborhood for comparison to column 2620A. In this example, the neighborhood has a range of two columns (e.g., columns 2620B-E/2720B-E) on both sides of column 2620A/2720A, corresponding to pixels 2602B-E/2702B-E in row 2601A/2701A on either side of pixel 2602A/2702A. Accordingly, in one embodiment, column 2620B/2720B may be selected in this iteration of block 2810.

In block 2812, noise filtering module 2112 compares pixels 2602B/2702B to pixel 2602A/2702A. In block 2814, counter A is adjusted if pixel 2602A/2702A has a lower value than pixel 2602B/2702B. Counter B is adjusted if pixel 2602A/2702A has an equal value as pixel 2602B/2702B. Counter C is adjusted if pixel 2602A/2702A has a higher value than pixel 2602B/2702B. In this example, pixel 2602A/2702A has an equal value as pixel 2602B/2702B. Accordingly, counter B will be adjusted, and counters A and C will not be adjusted in this iteration of block 2814.

In block 2816, if additional columns in the neighborhood remain to be compared (e.g., columns 2620C-E/2720C-E), then blocks 2810-2816 are repeated to compare the remaining pixels of the neighborhood (e.g., pixels 2602B-E/2702B-E residing in columns 2620C-E/2720C-E and in row 2601A/2701A) to pixel 2602A/2702A. In FIGS. 19A/20A, pixel 2602A/2702A has an equal value as all of pixels 2602B-E/2702B-E. Accordingly, after pixel 2602A/2702A has been compared with all pixels in its neighborhood, counter B will have been adjusted by four counts, and counters A and C will not have been adjusted.

In block 2818, if additional rows remain in infrared images 2600/2700 (e.g., rows 2601B-P/2701B-P), then blocks 2808-2818 are repeated to compare the remaining pixels of column 2620A/2720A with the remaining pixels of columns 2602B-E/2702B-E on a row by row basis as discussed above.

Following block 2818, each of the 16 pixels of column 2620A/2720A will have been compared to 4 pixels (e.g., pixels in columns 2620B-E residing in the same row as each compared pixel of column 2620A/2720A) for a total of 64 comparisons. This results in 64 adjustments collectively shared by counters A, B, and C.

FIG. 22A shows the values of counters A, B, and C represented by a histogram 2900 after all pixels of column 2620A have been compared to the various neighborhoods of pixels included in columns 2620B-E, in accordance with an embodiment of the disclosure. In this case, counters A, B, and C have values of 1, 48, and 15, respectively. Counter A was adjusted only once as a result of pixel 2622A of column 2620A having a lower value than pixel 2630 of column 2620B. Counter C was adjusted 15 times as a result of pixels 2622A-D each having a higher value when compared to their neighborhood pixels of columns 2620B-E (e.g., except for pixel 2630 as noted above). Counter B was adjusted 48 times as a result of the remaining pixels 2624 of column 2620A having equal values as the remaining neighborhood pixels of columns 2620B-E.

FIG. 22B shows the values of counters A, B, and C represented by a histogram 2950 after all pixels of column 2720A have been compared to the various neighborhoods of pixels included in columns 2720B-E, in accordance with an embodiment of the disclosure. In this case, counters A, B, and C have values of 1, 12, and 51, respectively. Similar to FIG. 22A, counter A in FIG. 22B was adjusted only once as a result of a pixel 2722A of column 2720A having a lower value than pixel 2730 of column 2720B. Counter C was adjusted 51 times as a result of pixels 2722A-M each having a higher value when compared to their neighborhood pixels of columns 2720B-E (e.g., except for pixel 2730 as noted above). Counter B was adjusted 12 times as a result of the remaining pixels of column 2720A having equal values as the remaining neighborhood compared pixels of columns 2720B-E.

Referring again to FIG. 21, in block 2820, the column correction term for column 2620A/2720A is updated (e.g., selectively incremented, decremented, or remain the same) based on the values of counters A, B, and C. For example, as discussed above, in some embodiments, the column correction term may be incremented if counter A−counter B−counter C>D; the column correction term may be decremented if counter C−counter A−counter B>D; and the column correction term may remain the same in all other cases.

In the case of infrared image 2600, applying the above calculations to the counter values identified in FIG. 22A results in no change to the column correction term (e.g., 1(counter A)−48(counter B)−15(counter C)=−62 which is not greater than D, where D equals (16 rows)/2; and 15(counter C)−1(counter A)−48(counter B)=−34 which is not greater than D, where D equals (16 rows)/2). Thus, in this case, the values of counters A, B, and C, and the calculations performed thereon indicate that values of pixels 2622A-D are associated with an actual object (e.g., object 2621) of scene 2170. Accordingly, the small vertical structure 2621 represented by pixels 2622A-D will not result in any overcompensation in the column correction term for column 2620A.

In the case of infrared image 2700, applying the above calculations to the counter values identified in FIG. 22B results in a decrement in the column correction term (e.g., 51(counter C)−1(counter A)−12(counter B)=38 which is greater than D, where D equals (16 rows)/2). Thus, in this case, the values of counters A, B, and C, and the calculations performed thereon indicate that the values of pixels 2722A-M are associated with column noise. Accordingly, the large vertical object 2721 represented by pixels 2722A-M will result in a lightening of column 2720A to improve the uniformity of corrected infrared image 2750 shown in FIG. 20B.

At block 2822, if additional columns remain to have their column correction terms updated, then the process returns to block 2806 wherein blocks 2806-2822 are repeated to update the column correction term of another column. After all column correction terms have been updated, the process returns to block 2802 where another infrared image is captured. In this manner, FIG. 21 may be repeated to update column correction terms for each newly captured infrared image.

In some embodiments, each newly captured infrared image may not differ substantially from recent preceding infrared images. This may be due to, for example, a substantially static scene 2170, a slowing changing scene 2170, temporal filtering of infrared images, and/or other reasons. In these cases, the accuracy of column correction terms determined by FIG. 21 may improve as they are selectively incremented, decremented, or remain unchanged in each iteration of FIG. 21. As a result, in some embodiments, many of the column correction terms may eventually reach a substantially steady state in which they remain relatively unchanged after a sufficient number of iterations of FIG. 21, and while the infrared images do not substantially change.

Other embodiments are also contemplated. For example, block 2820 may be repeated multiple times to update one or more column correction terms using the same infrared image for each update. In this regard, after one or more column correction terms are updated in block 2820, the process of FIG. 21 may return to block 2804 to apply the updated column correction terms to the same infrared image used to determine the updated column correction terms. As a result, column correction terms may be iteratively updated using the same infrared image. Such an approach may be used, for example, in offline (non-realtime) processing and/or in real-time implementations with sufficient processing capabilities.

In addition, any of the various techniques described with regard to FIGS. 19A-22B may be combined where appropriate with the other techniques described herein. For example, some or all portions of the various techniques described herein may be combined as desired to perform noise filtering.

Although column correction terms have been primarily discussed with regard to FIGS. 19A-22B, the described techniques may be applied to row-based processing. For example, such techniques may be used to determine and update row correction terms without overcompensating for small horizontal structures appearing in scene 2170, while also appropriately compensating for actual row noise. Such row-based processing may be performed in addition to, or instead of various column-based processing described herein. For example, additional implementations of counters A, B, and/or C may be provided for such row-based processing.

In some embodiments where infrared images are read out on a row-by-row basis, row-corrected infrared images may be may be rapidly provided as row correction terms are updated. Similarly, in some embodiments where infrared images are read out on a column-by-column basis, column-corrected infrared images may be may be rapidly provided as column correction terms are updated.

Referring now to FIGS. 23A-E, as discussed, in some embodiments the techniques described with regard to FIGS. 23A-E may be used in place of and/or in addition to one or more operations of blocks 565-573 (see FIGS. 5 and 8) to estimate FPN and/or determine NUC terms (e.g., flat field correction terms). For example, in some embodiments, such techniques may be used to determine NUC terms to correct for spatially correlated FPN and/or spatially uncorrelated (e.g., random) FPN without requiring high pass filtering.

Figure 23A:
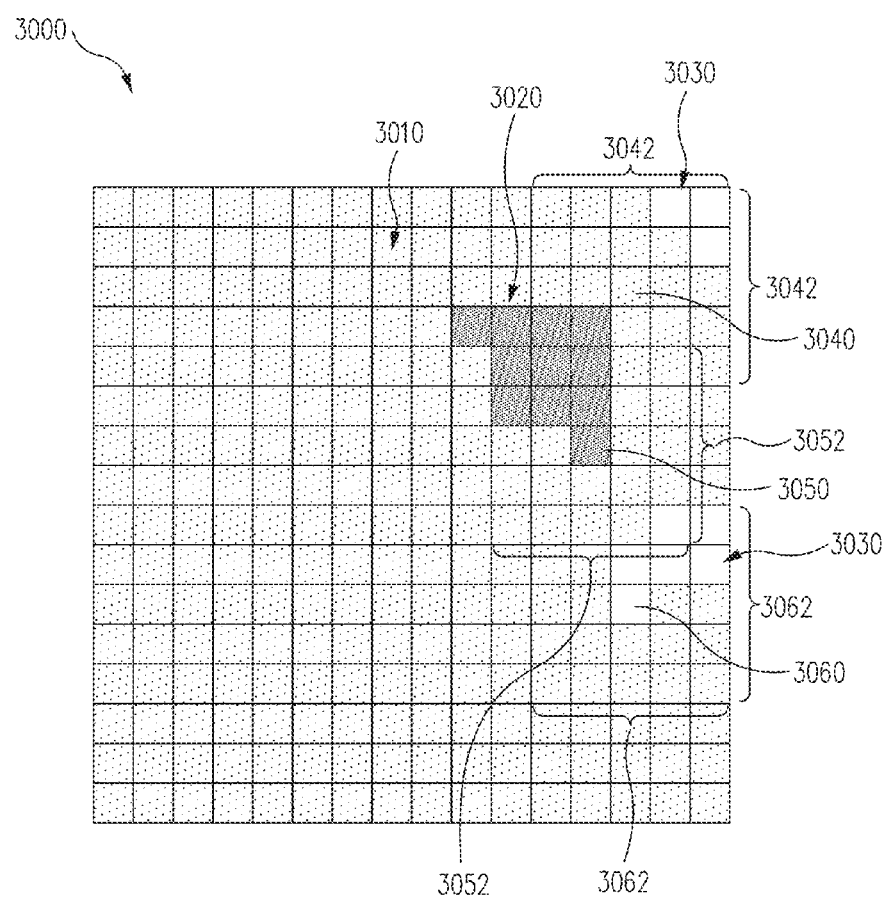
FIG. 23A illustrates an infrared image of a scene, in accordance with an embodiment of the disclosure.

FIG. 23A illustrates an infrared image 3000 (e.g., infrared image data) of scene 2170 in accordance with an embodiment of the disclosure. Although infrared image 3000 is depicted as having 16 rows and 16 columns, other image sizes are contemplated for infrared image 3000 and the various other infrared images discussed herein.

In FIG. 23A, infrared image 3000 depicts scene 2170 as relatively uniform, with a majority of pixels 3010 of infrared image 3000 having the same or similar intensity (e.g., the same or similar numbers of digital counts). Also in this embodiment, infrared image 3000 includes pixels 3020 which are depicted somewhat darker than other pixels 3010 of infrared image 3000, and pixels 3030 which are depicted somewhat lighter. As previously mentioned, for purposes of discussion, it will be assumed that darker pixels are associated with higher numbers of digital counts, however lighter pixels may be associated with higher numbers of digital counts in other implementations if desired.

In some embodiments, infrared image 3000 may be an image frame received at block 560 and/or block 565 of FIGS. 5 and 8 previously described herein. In this regard, infrared image 3000 may be an intentionally blurred image frame provided by block 555 and/or 560 in which much of the high frequency content has already been filtered out due to, for example, temporal filtering, defocusing, motion, accumulated image frames, and/or other techniques as appropriate. As such, in some embodiments, any remaining high spatial frequency content (e.g., exhibited as areas of contrast or differences in the blurred image frame) remaining in infrared image 3000 may be attributed to spatially correlated FPN and/or spatially uncorrelated FPN.

As such, it can be assumed that substantially uniform pixels 3010 generally correspond to blurred scene information, and pixels 3020 and 3030 correspond to FPN. For example, as shown in FIG. 23A, pixels 3020 and 3030 are arranged in several groups, each of which is positioned in a general area of infrared image 3000 that spans multiple rows and columns, but is not correlated to a single row or column.

Various techniques described herein may be used to determine NUC terms without overcompensating for the presence of nearby dark or light pixels. As will be further described herein, when such techniques are used to determine NUC terms for individual pixels (e.g., 3040, 3050, and 3060) of infrared image 3000, appropriate NUC terms may be determined to compensate for FPN where appropriate in some cases without overcompensating for FPN in other cases.

In accordance with various embodiments further described herein, a corresponding NUC term may be determined for each pixel of an infrared image. In this regard, a selected pixel of the infrared image may be compared with a corresponding set of other pixels (e.g., also referred to as neighborhood pixels) that are within a neighborhood associated with the selected pixel. In some embodiments, the neighborhood may correspond to pixels within a selected distance (e.g., within a selected kernel size) of the selected pixel (e.g., an N by N neighborhood of pixels around and/or adjacent to the selected pixel). For example, in some embodiments, a kernel of 5 may be used, but larger and smaller sizes are also contemplated.

As similarly discussed with regard to FIGS. 19A-22B, one or more counters (e.g., registers, memory locations, accumulators, and/or other implementations in processing component 2110, noise filtering module 2112, memory component 2120, and/or other components) are adjusted (e.g., incremented, decremented, or otherwise updated) based on the comparisons. In this regard, for each comparison where the selected pixel has a lesser value than a compared pixel of the neighborhood, a counter E may be adjusted. For each comparison where the selected pixel has an equal (e.g., exactly equal or substantially equal) value as a compared pixel of the neighborhood, a counter F may be adjusted. For each comparison where the selected pixel has a greater value than a compared pixel of the neighborhood, a counter G may be adjusted. Thus, if the neighborhood uses a kernel of 5, then a total of 24 comparisons may be made between the selected pixel and its neighborhood pixels. Accordingly, a total of 24 adjustments (e.g., counts) may be collectively held by counters E, F, and G. In this regard, counters E, F, and G may identify the number of comparisons for which neighborhood pixels were greater, equal, or less than the selected pixel.

After the selected pixel has been compared to all pixels in its neighborhood, a NUC term may be determined (e.g., adjusted) for the pixel based on the values of counters E, F, and G. Based on the distribution of the counts in counters E, F, and G, the NUC term for the selected pixel may be selectively incremented, decremented, or remain the same based on one or more calculations performed using values of one or more of counters E, F, and/or G.

Such adjustment of the NUC term may be performed in accordance with any desired calculation. For example, in some embodiments, if counter F is significantly larger than counters E and G or above a particular threshold value (e.g., indicating that a large number of neighborhood pixels are exactly equal or substantially equal to the selected pixel), then it may be decided that the NUC term should remain the same. In this case, even if several neighborhood pixels exhibit values that are significantly higher or lower than the selected pixel, those neighborhood pixels will not skew the NUC term as might occur in other mean-based or median-based calculations.

As another example, in some embodiments, if counter E or counter G is above a particular threshold value (e.g., indicating that a large number of neighborhood pixels are greater than or less than the selected pixel), then it may be decided that the NUC term should be incremented or decremented as appropriate. In this case, because the NUC term may be incremented or decremented based on the number of neighborhood pixels greater, equal, or less than the selected pixel (e.g., rather than the actual pixel values of such neighborhood pixels), the NUC term may be adjusted in a gradual fashion without introducing rapid changes that may inadvertently overcompensate for pixel value differences.

The process may be repeated by resetting counters E, F, and G, selecting another pixel of infrared image 3000, performing comparisons with its neighborhood pixels, and determining its NUC term based on the new values of counters E, F, and G. These operations can be repeated as desired until a NUC term has been determined for every pixel of infrared image 3000.

In some embodiments, after NUC terms have been determined for all pixels, the process may be repeated to further update the NUC terms using the same infrared image 3000

(e.g., after application of the NUC terms) and/or another infrared image (e.g., a subsequently captured infrared image).

As discussed, counters E, F, and G identify the number of neighborhood pixels that are greater than, equal to, or less than the selected pixel. This contrasts with various other techniques used to determine NUC terms where the actual differences (e.g., calculated difference values) between compared pixels may be used.

Counters E, F, and G identify relative relationships (e.g., less than, equal to, or greater than relationships) between the selected pixel and its neighborhood pixels. In some embodiments, such relative relationships may correspond, for example, to the sign (e.g., positive, negative, or zero) of the difference between the values of the selected pixel and its neighborhood pixels. By determining NUC terms based on relative relationships rather than actual numerical differences, the NUC terms may not be skewed by small numbers of neighborhood pixels having digital counts that widely diverge from the selected pixel.

In addition, using this approach may reduce the effects of other types of scene information on NUC term values. In this regard, because counters E, F, and G identify relative relationships between pixels rather than actual numerical differences, exponential scene changes (e.g., non-linear scene information gradients) may contribute less to NUC term determinations. For example, exponentially higher digital counts in certain pixels may be treated as simply being greater than or less than other pixels for comparison purposes and consequently will not unduly skew the NUC term. Moreover, this approach may be used without unintentionally distorting infrared images exhibiting a nonlinear slope.

Advantageously, counters E, F, and G provide an efficient approach to calculating NUC terms. In this regard, in some embodiments, only three counters E, F, and G are used to store the results of all neighborhood pixel comparisons performed for a selected pixel. This contrasts with various other approaches in which many more unique values are stored (e.g., where particular numerical differences, or the number of occurrences of such numerical differences, are stored), median filters are used (e.g., which may require sorting and the use of high pass or low pass filters including a computationally intensive divide operation to obtain a weighted mean of neighbor pixel values).

In some embodiments, where the size of a neighborhood and/or kernel is known, further efficiency may be achieved by omitting counter E. In this regard, the total number of counts may be known based on the number of pixels known to be in the neighborhood. In addition, it may be assumed that any comparisons that do not result in counter E or counter G being adjusted will correspond to those comparisons where pixels have equal values. Therefore, the value that would have been held by counter F may be determined from counters E and G (e.g., (number of neighborhood pixels)−counter E value−counter G value=counter F value).

In some embodiments, only a single counter may be used. In this regard, a single counter may be selectively adjusted in a first manner (e.g., incremented or decremented) for each comparison where the selected pixel has a greater value than a neighborhood pixel, selectively adjusted in a second manner (e.g., decremented or incremented) for each comparison where the selected pixel has a lesser value than a neighborhood pixel, and not adjusted (e.g., retaining its existing value) for each comparison where the selected pixel has an equal (e.g., exactly equal or substantially equal) value as a neighborhood pixel. Thus, the value of the single counter may indicate relative numbers of compared pixels that are greater than or less than the selected pixel (e.g., after the selected pixel has been compared with all of its corresponding neighborhood pixels).

A NUC term for the selected pixel may be updated (e.g., incremented, decremented, or remain the same) based on the value of the single counter. For example, in some embodiments, if the single counter exhibits a baseline value (e.g., zero or other number) after comparisons are performed, then the NUC term may remain the same. In some embodiments, if the single counter is greater or less than the baseline value, the NUC term may be selectively incremented or decremented as appropriate to reduce the overall differences between the selected pixel and the its corresponding neighborhood pixels. In some embodiments, the updating of the NUC term may be conditioned on the single counter having a value that differs from the baseline value by at least a threshold amount to prevent undue skewing of the NUC term based on limited numbers of neighborhood pixels having different values from the selected pixel.

Figure 23B:
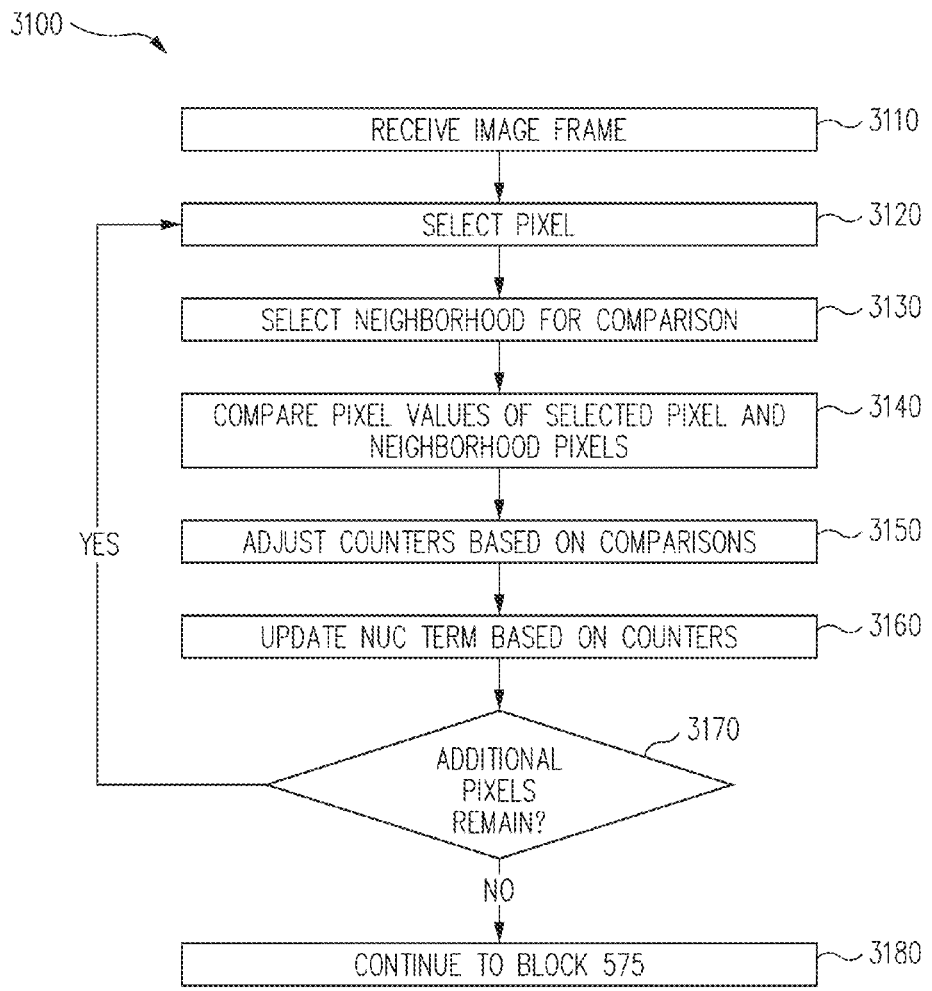
FIG. 23B is a flowchart illustrating still another method for noise filtering an infrared image in accordance with an embodiment of the disclosure.

Various aspects of these techniques are further explained with regard to FIGS. 23B-E. In this regard, FIG. 23B is a flowchart illustrating a method 3100 for noise filtering an infrared image, in accordance with an embodiment of the disclosure. Although particular components of system 2100 are referenced in relation to particular blocks of FIG. 23B, the various operations described with regard to FIG. 23B may be performed by any appropriate components, such as image capture component 2130, processing component, 2110, noise filtering module 2112, memory component 2120, control component 2140, and/or others. In some embodiments, the operations of FIG. 23B may be performed, for example, in place of blocks 565-573 of FIGS. 5 and 8.

In block 3110, an image frame (e.g., infrared image 3000) is received. For example, as discussed, infrared image 3000 may be an intentionally blurred image frame provided by block 555 and/or 560.

In block 3120, noise filtering module 2112 selects a pixel of infrared image 3000 for which a NUC term will be determined. For example, in some embodiments, the selected pixel may be pixel 3040, 3050, or 3060. However, any pixel of infrared image 3000 may be selected. In some embodiments, block 3120 may also include resetting counters E, F, and G to zero or another appropriate default value.

In block 3130, noise filtering module 2112 selects a neighborhood (e.g., a pixel neighborhood) associated with the selected pixel. As discussed, in some embodiments, the neighborhood may correspond to pixels within a selected distance of the selected pixel. In the case of selected pixel 3040, a kernel of 5 corresponds to a neighborhood 3042 (e.g., including 24 neighborhood pixels surrounding selected pixel 3040). In the case of selected pixel 3050, a kernel of 5 corresponds to a neighborhood 3052 (e.g., including 24 neighborhood pixels surrounding selected pixel 3050). In the case of selected pixel 3060, a kernel of 5 corresponds to a neighborhood 3062 (e.g., including 24 neighborhood pixels surrounding selected pixel 3060). As discussed, larger and smaller kernel sizes are also contemplated.

In blocks 3140 and 3150, noise filtering module 2112 compares the selected pixel to its neighborhood pixels and adjusts counters E, F, and G based on the comparisons performed in block 3140. Blocks 3140 and 3150 may be performed in any desired combination such that counters E, F, and G may be updated after each comparison and/or after all comparisons have been performed.

Figure 23C:
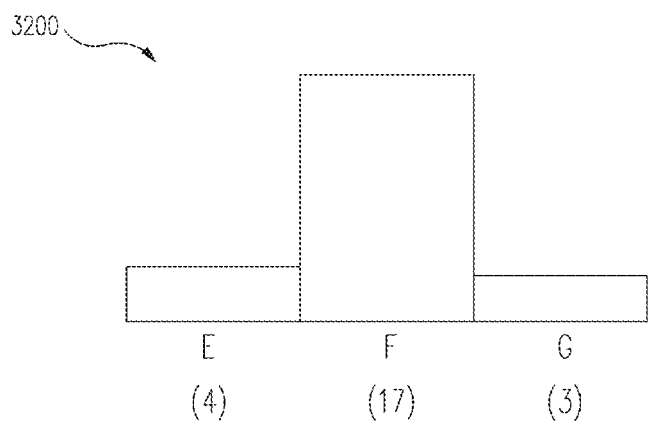
FIGS. 23C-E show histograms prepared for neighborhoods around selected pixels of the infrared image of FIG. 23A in accordance with embodiments of the disclosure.

In the case of selected pixel 3040, FIG. 23C shows the adjusted values of counters E, F, and G represented by a histogram 3200 after selected pixel 3040 has been compared to the pixels of neighborhood 3042. Neighborhood 3042 includes 4 pixels having higher values, 17 pixels having equal values, and 3 pixels having lower values than selected pixel 3040. Accordingly, counters E, F, and G may be adjusted to the values shown in FIG. 23C.

Figure 23D:
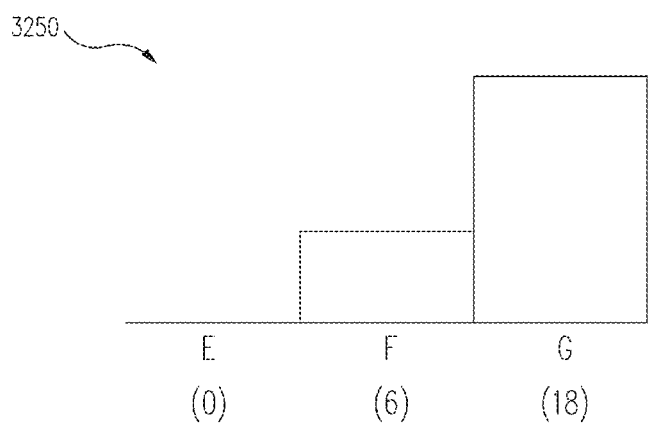

In the case of selected pixel 3050, FIG. 23D shows the adjusted values of counters E, F, and G represented by a histogram 3250 after selected pixel 3050 has been compared to the pixels of neighborhood 3052. Neighborhood 3052 includes 0 pixels having higher values, 6 pixels having equal values, and 18 pixels having lower values than selected pixel 3050. Accordingly, counters E, F, and G may be adjusted to the values shown in FIG. 23D.

Figure 23E:
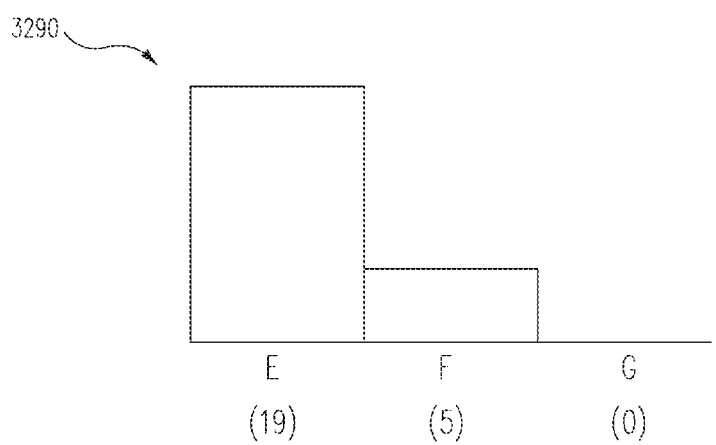

In the case of selected pixel 3060, FIG. 23E shows the adjusted values of counters E, F, and G represented by a histogram 3290 after selected pixel 3060 has been compared to the pixels of neighborhood 3062. Neighborhood 3062 includes 19 pixels having higher values, 5 pixels having equal values, and 0 pixels having lower values than selected pixel 3060. Accordingly, counters E, F, and G may be adjusted to the values shown in FIG. 23E.

In block 3160, the NUC term for the selected pixel is updated (e.g., selectively incremented, decremented, or remain the same) based on the values of counters E, F, and G. Such updating may be performed in accordance with any appropriate calculation using the values of counters E, F, and G.

For example, in the case of selected pixel 3040, counter F in FIG. 23C indicates that most neighborhood pixels (e.g., 17 neighborhood pixels) have values equal to selected pixel 3040, while counters E and G indicate that smaller numbers of neighborhood pixels have values greater than (e.g., 4 neighborhood pixels) or less than (e.g., 3 neighborhood pixels) selected pixel 3040. Moreover, the number of neighborhood pixels having values greater than and less than selected pixel 3040 are similar (e.g., 4 and 3 neighborhood pixels, respectively). Accordingly, in this case, noise filtering module 2112 may choose to keep the NUC term for selected pixel 3040 the same (e.g., unchanged) since a further offset of selected pixel 3040 would likely introduce additional non-uniformity into infrared image 3000.

In the case of selected pixel 3050, counter G in FIG. 23D indicates that most neighborhood pixels (e.g., 18 neighborhood pixels) have values less than selected pixel 3050, while counter F indicates that a smaller number of neighborhood pixels (e.g., 6 neighborhood pixels) have values equal to selected pixel 3050, and counter E indicates that no neighborhood pixels (e.g., 0 neighborhood pixels) have values greater than selected pixel 3050. These counter values suggest that selected pixel 3050 is exhibiting FPN that appears darker than most neighborhood pixels. Accordingly, in this case, noise filtering module 2112 may choose to decrement the NUC term for selected pixel 3050 (e.g., to lighten selected pixel 3050) such that it exhibits more uniformity with the large numbers of neighborhood pixels having lower values.

In the case of selected pixel 3060, counter E in FIG. 23E indicates that most neighborhood pixels (e.g., 19 neighborhood pixels) have values greater than selected pixel 3060, while counter F indicates that a smaller number of neighborhood pixels (e.g., 5 neighborhood pixels) have values equal to selected pixel 3060, and counter G indicates that no neighborhood pixels (e.g., 0 neighborhood pixels) have values less than selected pixel 3060. These counter values suggest that selected pixel 3060 is exhibiting FPN that appears lighter than most neighborhood pixels. Accordingly, in this case, noise filtering module 2112 may choose to increment the NUC term for selected pixel 3060 (e.g., to darken selected pixel 3060) such that it exhibits more uniformity with the large numbers of neighborhood pixels having higher values.

In block 3160, changes to the NUC term for the selected pixel may be made incrementally. For example, in some embodiments, the NUC term may be incremented or decremented by a small amount (e.g., only one or several digital counts in some embodiments) in block 3160. Such incremental changes can prevent large rapid changes in NUC terms that may inadvertently introduce undesirable non-uniformities in infrared image 3000. The process of FIG. 23B may be repeated during each iteration of FIGS. 5 and 8 (e.g., in place of blocks 565 and/or 570). Therefore, if large changes in the NUC term are required, then the NUC term may be repeatedly incremented and/or decremented during each iteration until the NUC value stabilizes (e.g., stays substantially the same during further iterations). In some embodiments, the block 3160 may further include weighting the updated NUC term based on local gradients and/or temporal damping as described herein.

At block 3170, if additional pixels of infrared image 3000 remain to be selected, then the process returns to block 3120 wherein blocks 3120-3170 are repeated to update the NUC term for another selected pixel. In this regard, blocks 3120-3170 may be iterated at least once for each pixel of infrared image 3000 to update the NUC term for each pixel (e.g., each pixel of infrared image 3000 may be selected and its corresponding NUC term may be updated during a corresponding iteration of blocks 3120-3170).

At block 3180, after NUC terms have been updated for all pixels of infrared image 3000, the process continues to block 575 of FIGS. 5 and 8. Operations of one or more of blocks 565-573 may also be performed in addition to the process of FIG. 23B.

The process of FIG. 23B may be repeated for each intentionally blurred image frame provided by block 555 and/or 560. In some embodiments, each new image frame received at block 3110 may not differ substantially from other recently received image frames (e.g., in previous iterations of the process of FIG. 23B). This may be due to, for example, a substantially static scene 2170, a slowing changing scene 2170, temporal filtering of infrared images, and/or other reasons. In these cases, the accuracy of NUC terms determined by FIG. 23B may improve as they are selectively incremented, decremented, or remain unchanged in each iteration of FIG. 23B. As a result, in some embodiments, many of the NUC terms may eventually reach a substantially steady state in which they remain relatively unchanged after a sufficient number of iterations of FIG. 23B, and while the image frames do not substantially change.

Other embodiments are also contemplated. For example, block 3160 may be repeated multiple times to update one or more NUC terms using the same infrared image for each update. In this regard, after a NUC term is updated in block 3160 or after multiple NUC terms are updated in additional iterations of block 3160, the process of FIG. 23B may first apply the one or more updated NUC terms (e.g., also in block 3160) to the same infrared image used to determine the updated NUC terms and return to block 3120 to iteratively update one or more NUC terms using the same infrared image in such embodiments. Such an approach may be used, for example, in offline (non-realtime) processing and/or in real-time implementations with sufficient processing capabilities.

Any of the various techniques described with regard to FIGS. 23A-E may be combined where appropriate with the other techniques described herein. For example, some or all portions of the various techniques described herein may be combined as desired to perform noise filtering.

Any of the various methods, processes, and/or operations described herein may be performed by any of the various systems, devices, and/or components described herein where appropriate.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
   receiving an image frame comprising a plurality of pixels arranged in a plurality of rows and columns, wherein the pixels comprise thermal image data associated with a scene and noise introduced by an infrared imaging device; and
   processing the image frame to determine a plurality of column correction terms to reduce at least a portion of the noise, wherein each column correction term is associated with a corresponding one of the columns and is determined based on relative relationships between the pixels of the corresponding column and the pixels of a neighborhood of columns, wherein the processing the image frame comprises:
   selecting one of the columns,
   for each pixel of the selected column, comparing the pixel to a corresponding plurality of neighborhood pixels in the neighborhood of columns,
   for each comparison, adjusting a first counter if the pixel of the selected column has a value greater than the compared neighborhood pixel,
   for each comparison, adjusting a second counter if the pixel of the selected column has a value less than the compared neighborhood pixel, and
   selectively updating the column correction term associated with the selected column based on the first and second counters.

2. The method of claim 1, wherein the updating comprises:
   performing one or more calculations using values of the first and second counters;
   adjusting the column correction term if the one or more calculations indicate that the values of the pixels of the selected column are associated with column noise; and
   refraining from adjusting the column correction term if the one or more calculations indicate that the values of the pixels of the selected column are associated with an object in the scene.

3. The method of claim 1, further comprising, for each comparison, adjusting a third counter if the pixel of the selected column has a value equal to the compared neighborhood pixel, wherein the updating is also based on the third counter.

4. The method of claim 1, wherein the neighborhood pixels corresponding to each pixel of the selected column reside in a neighborhood defined by an intersection of: the same row as the pixel of the selected column; and a predetermined range of columns.

5. The method of claim 1, wherein the image frame is a first image frame, the method further comprising:
   receiving a second image frame;
   applying the updated column correction term to the second image frame to provide a corrected image frame; and
   performing the selecting, comparing, adjusting, and updating using the corrected image frame to further update the column correction term.

6. The method of claim 1, further comprising:
   applying the updated column correction term to the image frame to provide a corrected image frame; and
   repeating the comparing, adjusting, and updating for the selected column using the corrected image frame.

7. The method of claim 1, wherein the first and second counters are first and second column-based processing counters, wherein the neighborhood pixels are first neighborhood pixels, the method further comprising:
   selecting one of the rows;
   for each pixel of the selected row, comparing the pixel to a corresponding plurality of second neighborhood pixels in a neighborhood of rows;
   for each comparison, adjusting a first row-based processing counter if the pixel of the selected row has a value greater than the compared second neighborhood pixel;
   for each comparison, adjusting a second row-based processing counter if the pixel of the selected row has a value less than the compared second neighborhood pixel; and
   selectively updating a row correction term associated with the selected row based on the first and second row-based processing counters.

8. The method of claim 1, wherein the image frame is an intentionally blurred image frame comprising an accumulated set of image frames captured while the infrared imaging device was in motion relative to at least a portion of the scene.

9. The method of claim 1, wherein the image frame is an intentionally blurred image frame captured while the infrared imaging device was intentionally defocused.

10. The method of claim 1, wherein the image frame is an intentionally blurred image frame, the method further comprising:
    applying the column correction terms to the blurred image frame to reduce the noise comprising spatially correlated fixed pattern noise (FPN); and
    after the applying, further processing the blurred image frame to determine a plurality of non-uniformity correction (NUC) terms, wherein each NUC term is associated with a corresponding one of the pixels.

11. A method comprising: receiving an image frame comprising a plurality of pixels arranged in a plurality of rows and columns, wherein the pixels comprise thermal image data associated with a scene and noise introduced by an infrared imaging device; and processing the image frame to determine a plurality of column correction terms to reduce at least a portion of the noise, wherein each column correction term is associated with a corresponding one of the columns and is determined based on relative relationships between the pixels of the corresponding colum and the pixels of a neighborhood of colums, wherein the processing comprises:
select one of the columns,
for each pixel of the selected column, compare the pixel to a corresponding plurality of neighborhood pixels in the neighborhood of columns,
for each comparison, adjust a counter in a first manner if the pixel of the selected column has a value greater than the compared neighborhood pixel or a second manner if the pixel of the selected column has a value less than the compared neighborhood pixel, and
selectively update the column correction term associated with the selected column based on the counter.

12. A system comprising:
a memory component adapted to receive an image frame comprising a plurality of pixels arranged in a plurality of rows and columns, wherein the pixels comprise thermal image data associated with a scene and noise introduced by an infrared imaging device; and
a processor adapted to execute instructions to process the image frame to determine a plurality of column correction terms to reduce at least a portion of the noise, wherein each column correction term is associated with a corresponding one of the columns and is determined based on relative relationships between the pixels of the corresponding column and the pixels of a neighborhood of columns, wherein the instructions to process the image frame are adapted to cause the processor to:
select one of the columns,
for each pixel of the selected column, compare the pixel to a corresponding plurality of neighborhood pixels in the neighborhood of columns,
for each comparison, adjust a first counter if the pixel of the selected column has a value greater than the compared neighborhood pixel,
for each comparison, adjust a second counter if the pixel of the selected column has a value less than the compared neighborhood pixel, and
selectively update the column correction term associated with the selected column based on the first and second counters.

13. The system of claim 12, wherein the instructions to update the column correction term are adapted to cause the processor to:
perform one or more calculations using values of the first and second counters;
adjust the column correction term if the one or more calculations indicate that the values of the pixels of the selected column are associated with column noise; and
refrain from adjusting the column correction term if the one or more calculations indicate that the values of the pixels of the selected column are associated with an object in the scene.

14. The system of claim 12, wherein:
the processor is adapted to execute instructions to, for each comparison, adjust a third counter if the pixel of the selected column has a value equal to the compared neighborhood pixel; and
the instructions to update the column correction term are adapted to cause the processor to selectively update the column correction term also based on the third counter.

15. The system of claim 12, wherein the neighborhood pixels corresponding to each pixel of the selected column reside in a neighborhood defined by an intersection of: the same row as the pixel of the selected column; and a predetermined range of columns.

16. The system of claim 12, wherein;
the image frame is a first image frame;
the memory component is adapted to receive a second image frame; and
the processor is adapted to execute instructions to:
apply the updated column correction term to the second image frame to provide a corrected image frame; and
perform the selecting, comparing, adjusting, and updating using the corrected image frame to further update the column correction term.

17. The system of claim 12, wherein the processor is adapted to execute instructions to:
apply the updated column correction term to the image frame to provide a corrected image frame; and
repeat the compare, adjust, and update operations for the selected column using the corrected image frame.

18. The system of claim 12, wherein the first and second counters are first and second column-based processing counters, wherein the neighborhood pixels are first neighborhood pixels, wherein the instructions to process the image frame are adapted to cause the processor to:
select one of the rows;
for each pixel of the selected row, compare the pixel to a corresponding plurality of second neighborhood pixels in a neighborhood of rows;
for each comparison, adjust a first row-based processing counter if the pixel of the selected row has a value greater than the compared second neighborhood pixel;
for each comparison, adjust a second row-based processing counter if the pixel of the selected row has a value less than the compared second neighborhood pixel; and
selectively update a row correction term associated with the selected row based on the first and second row-based processing counters.

19. The system of claim 12, wherein the image frame is an intentionally blurred image frame comprising an accumulated set of image frames captured while the infrared imaging device was in motion relative to at least a portion of the scene.

20. The system of claim 12, wherein the image frame is an intentionally blurred image frame captured while the infrared imaging device was intentionally defocused.

21. The system of claim 12, wherein the image frame is an intentionally blurred image frame, wherein the processor is adapted to execute instructions to:
apply the column correction terms to the blurred image frame to reduce the noise comprising spatially correlated fixed pattern noise (FPN); and
after the column correction terms are applied, further process the blurred image frame to determine a plurality of non-uniformity correction (NUC) terms, wherein each NUC term is associated with a corresponding one of the pixels.

22. The system of claim 12, further comprising a focal plane array (FPA) adapted to provide the image frame, wherein the FPA comprises an array of microbolometers adapted to receive a bias voltage selected from a range of approximately 0.2 to approximately 0.7 volts.

23. A system comprising:
a memory component adapted to receive an image frame comprising a plurality of pixels arranged in a plurality of rows and columns, wherein the pixels comprise thermal image data associated with a scene and noise introduced by an infrared imaging device; and a processor adapted to execute instructions to process the image frame to determine a plurality of column correction terms to reduce at least a portion of the noise, wherein each column correction term is associated with a corresponding one of the columns and is determined based on relative relationships between the pixels of the corresponding column and the pixels of a neighborhood of columns, wherein the instructions to process the image frame are adapted to cause the processor to:

select one of the columns, for each pixel of the selected column, compare the pixel to a corresponding plurality of neighborhood pixels in the neighborhood of columns, for each comparison, adjust a counter in a first manner if the pixel of the selected column has a value greater than the compared neighborhood pixel or a second manner if the pixel of the selected column has a value less than the compared neighborhood pixel, and selectively update the column correction term associated with the selected column based on the counter.

* * * * *